(12) United States Patent (10) Patent No.: US 10,071,438 B2
Wallace (45) Date of Patent: Sep. 11, 2018

(54) METHODS OF FORMING SHANKS

(71) Applicant: The Boeing Company, Chicago, IL (US)

(72) Inventor: Steven Graham Wallace, Seattle, WA (US)

(73) Assignee: The Boeing Company, Chicago, IL (US)

(*) Notice: Subject to any disclaimer, the term of this patent is extended or adjusted under 35 U.S.C. 154(b) by 274 days.

(21) Appl. No.: 14/728,820

(22) Filed: Jun. 2, 2015

(65) Prior Publication Data

US 2016/0356305 A1 Dec. 8, 2016

(51) Int. Cl.
*B26D 1/12* (2006.01)
*B23K 20/02* (2006.01)
(Continued)

(52) U.S. Cl.
CPC .......... *B23K 20/023* (2013.01); *B23B 31/005* (2013.01); *B23P 15/34* (2013.01);
(Continued)

(58) Field of Classification Search
CPC .... F16C 3/023; B29L 2031/06; B23B 31/005; B23K 2201/002; B23K 2201/20; B23K 20/02–20/028
See application file for complete search history.

(56) References Cited

U.S. PATENT DOCUMENTS 971,039 A * 9/1910 Hackett ................. B23B 31/005
408/226
988,903 A * 4/1911 Smith ................... B23B 31/005
175/320
(Continued)

FOREIGN PATENT DOCUMENTS

CA 2398694 A1 8/2001
DE 869892 C 3/1953
(Continued)

OTHER PUBLICATIONS

"U.S. Appl. No. 14/728,785, Examiner Interview Summary dated Mar. 29, 2017", 3 pages.
(Continued)

*Primary Examiner* — Erin B Saad
*Assistant Examiner* — Carlos J Gamino
(74) *Attorney, Agent, or Firm* — Kwan & Olynick LLP

(57) ABSTRACT

A method of forming a shank comprises arranging first structures in a first set of the first structures and second structures in a second set of the second structures such that the first structures and the second structures extend away from a longitudinal central axis in a direction normal to the longitudinal central axis and such that ends of the first structures and the second structures, farthest away from the longitudinal central axis, form cylindrical surfaces, parallel to the longitudinal central axis and equidistant from the longitudinal central axis. The method further comprises indirectly bonding the first set of the first structures to the second set of the second structures, thereby forming the shank. At least one of the first structures consists of a first material. At least one of the second structures consists of a second material, such that the first material is different from the second material.

20 Claims, 13 Drawing Sheets

(51) Int. Cl.
*B23B 31/00* (2006.01)
*B23P 15/34* (2006.01)

(52) U.S. Cl.
CPC . *B23B 2231/026* (2013.01); *B23B 2231/0268* (2013.01); *B23B 2240/16* (2013.01)

(56) References Cited

U.S. PATENT DOCUMENTS

| | | | | |
|---|---|---|---|---|
| 994,154 | A * | 6/1911 | Hackett | B23B 51/123 279/102 |
| 1,820,644 | A * | 8/1931 | Bach | B23B 31/1107 267/264 |
| 2,446,801 | A | 8/1948 | Barrick | |
| 2,610,066 | A * | 9/1952 | Pigott | B23B 31/202 279/51 |
| 3,923,413 | A * | 12/1975 | Giles | B23B 31/005 33/670 |
| 4,133,230 | A * | 1/1979 | Inaba | B23Q 5/10 82/142 |
| RE32,364 | E * | 2/1987 | Carmien | A01B 1/22 294/54.5 |
| 4,710,075 | A * | 12/1987 | Davison | A61B 17/16 33/512 |
| 5,301,961 | A * | 4/1994 | Wozar | B23B 31/1177 279/46.2 |
| 5,322,304 | A * | 6/1994 | Rivin | B23B 31/006 279/103 |
| 5,813,812 | A | 9/1998 | Moran et al. | |
| 6,599,068 | B1 * | 7/2003 | Miyazawa | B23B 31/006 279/103 |
| 6,779,955 | B2 * | 8/2004 | Rivin | B23B 31/006 188/379 |
| 7,284,938 | B1 * | 10/2007 | Miyazawa | B23B 31/006 409/141 |
| 7,938,408 | B2 | 5/2011 | Haimer | |
| 8,899,597 | B2 * | 12/2014 | Gerber | B23B 31/005 279/7 |
| 9,205,496 | B2 | 12/2015 | Haimer et al. | |
| 9,616,507 | B2 * | 4/2017 | Azegami | B23C 5/10 |
| 2007/0140803 | A1 * | 6/2007 | Filho | B23B 31/02 409/234 |
| 2008/0101977 | A1 * | 5/2008 | Eason | B22F 7/062 419/38 |
| 2014/0210169 | A1 | 7/2014 | Mizoguchi | |
| 2014/0245584 | A1 | 9/2014 | Wallace | |
| 2016/0354845 | A1 | 12/2016 | Wallace | |

FOREIGN PATENT DOCUMENTS

| | | | | |
|---|---|---|---|---|
| DE | 3028896 | A * | 2/1982 | |
| DE | 102010006918 | A1 * | 8/2011 | B23B 31/005 |
| JP | 11235608 | A * | 8/1999 | |
| KR | 2011053667 | A * | 5/2011 | |
| SU | 1313574 | A1 | 5/1987 | |
| SU | 1360910 | A * | 12/1987 | |

OTHER PUBLICATIONS

"U.S. Appl. No. 14/728,785, Non Final Office Action dated Jan. 26, 2017", 12 pages.
"U.S. Appl. No. 14/728,785, Restriction Requirement dated Nov. 10, 2016", 7 pages.
Chandler, David L. , "A New Way to Make Microstructured Surfaces", Retrieved from the Internet: http://news.mit.edu/2014/newwaytomakemicrostructuredsurfaces0729, Accessed on Mar. 6, 2017, Jul. 29, 2014, 3 pgs.
"Expanded AntiPullout System Enables Secure Titanium Milling with ER Collet Systems", Modern Machine Shop, Nov. 25, 2014, 2 pgs.
"TENDO Aviation hydraulic expansion Toolholder. More Safety for highest Demands in high-performance Machining, e.g. of Titanium", TENDO Aviation Toolholders, Sep. 2014, pp. 24-25.
Wallace, Steven G. , "Receivers and Methods for Forming Such Receivers", U.S. Appl. No. 14/728,785, filed Jun. 2, 2015, 95 pgs.
"U.S. Appl. No. 14/728,785, Examiner Interview Summary dated Sep. 12, 2017", 3 pages.
"U.S. Appl. No. 14/728,785, Final Office Action dated Jun. 28, 2017", 14 pages.
"U.S. Appl. No. 14/728,785, Non Final Office Action dated Sep. 29, 2017", 16 pgs.

* cited by examiner

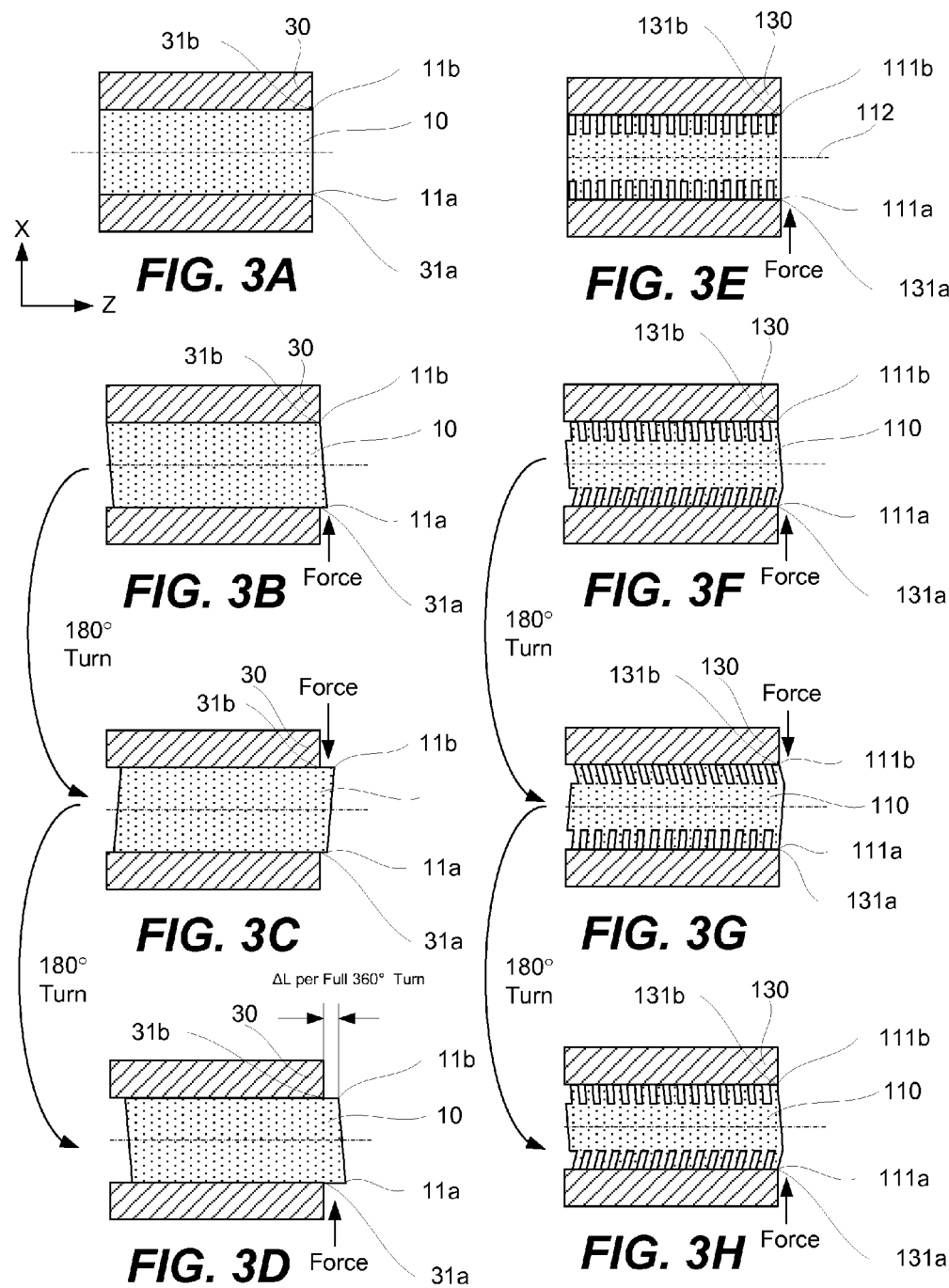

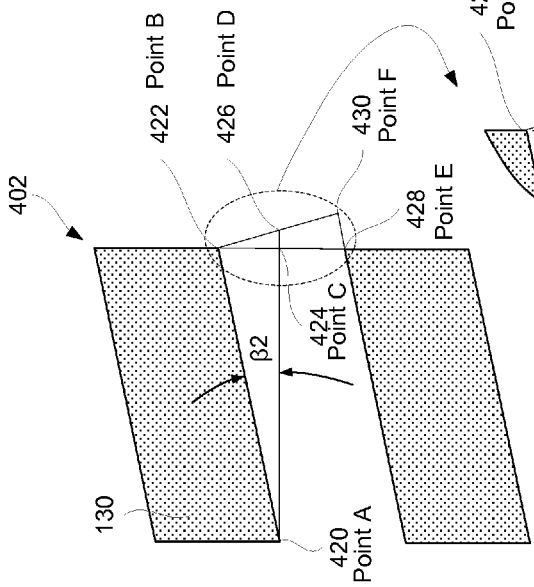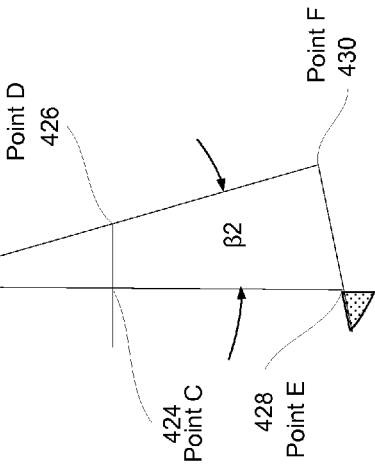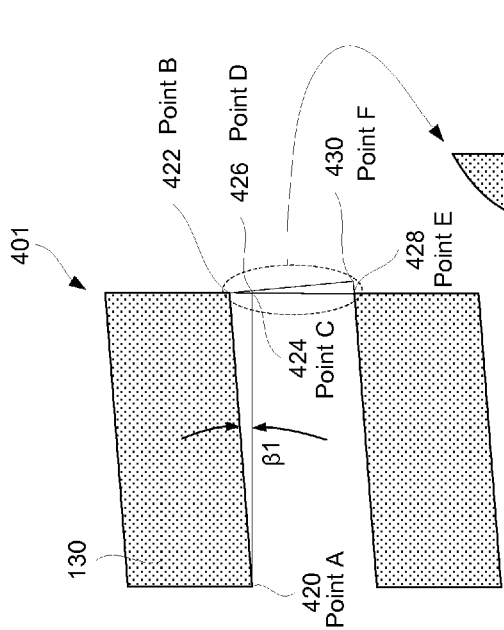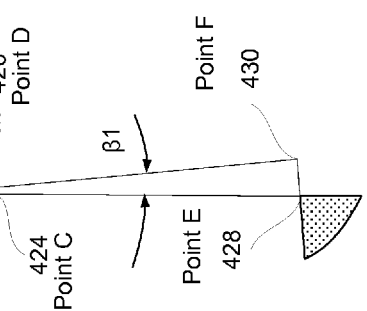

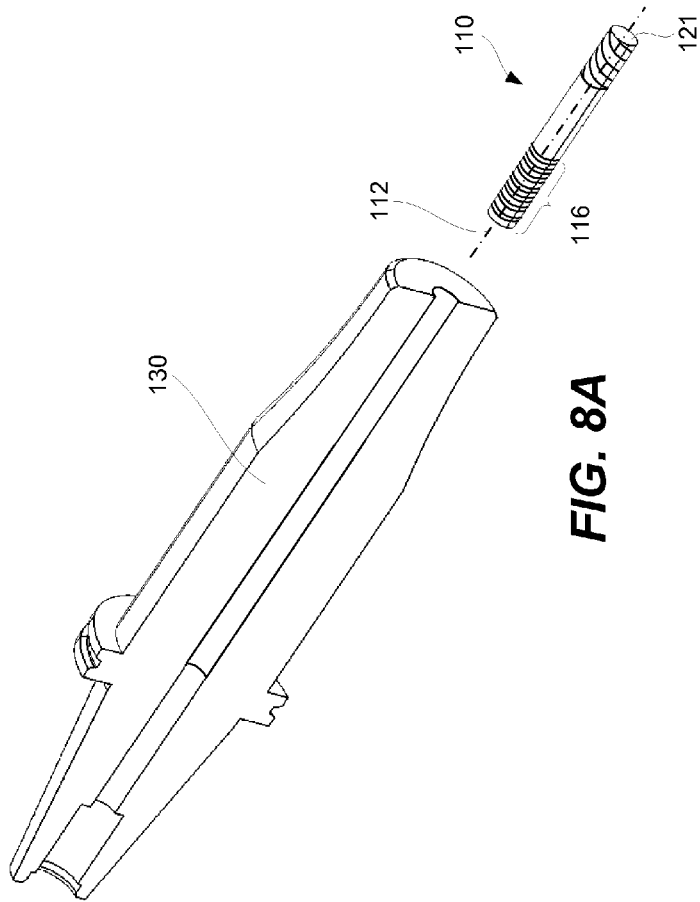
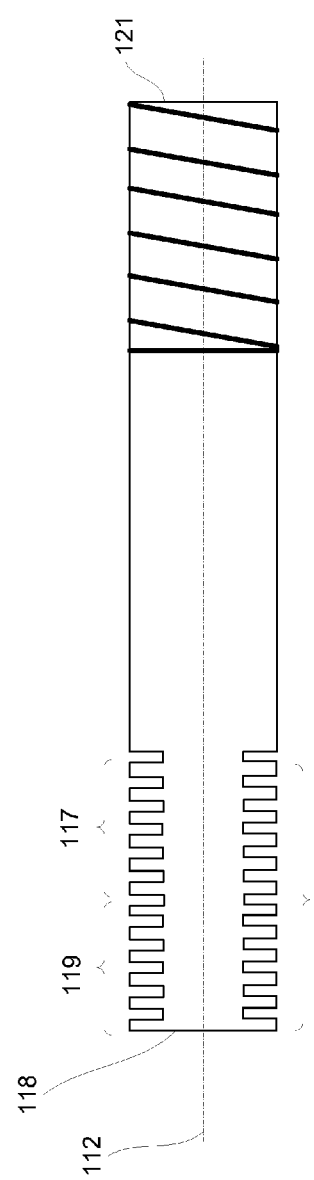
FIG. 8A
FIG. 8B

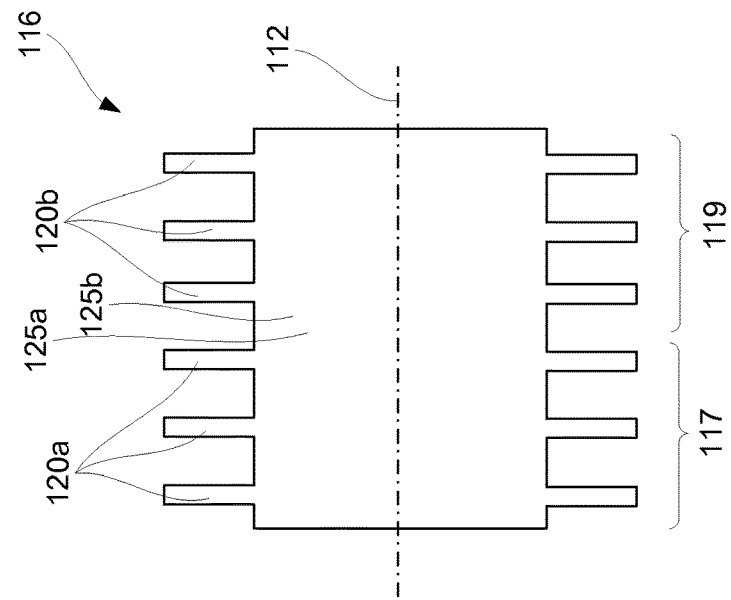
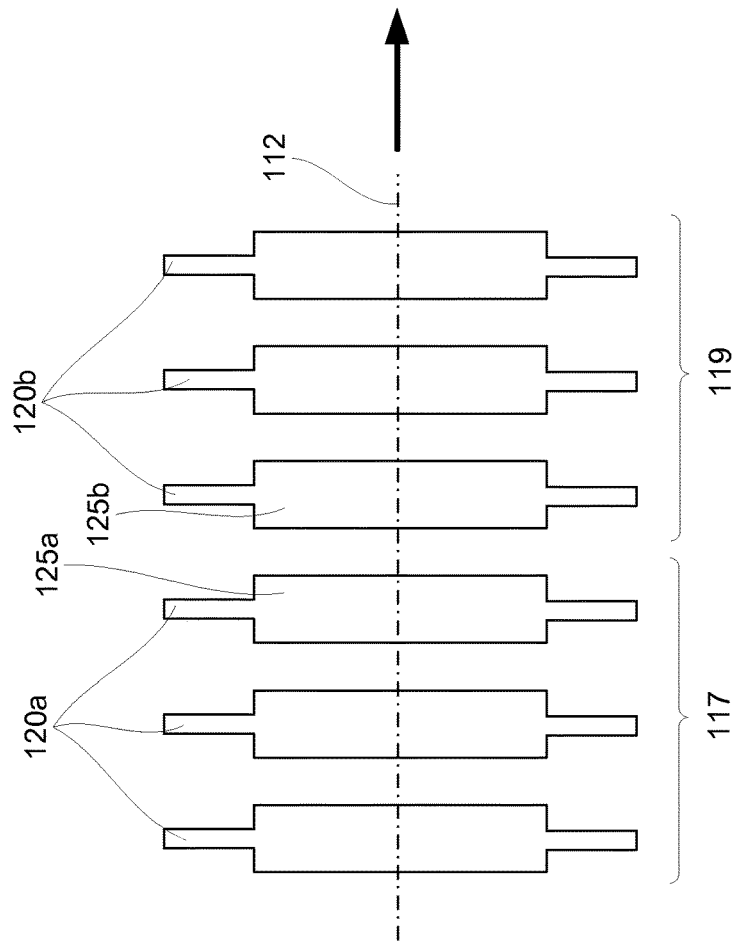
FIG. 9B
FIG. 9A

METHODS OF FORMING SHANKS

BACKGROUND

A machining cutter, such as an end mill or, more generally, a shank, has a tendency to "walk out" of its receiver (or collet) when used for heavy machining operations during which large quantities of material are machined away in a single pass. Such "walk-out" of the cutter leads to a loss of machining accuracy, thus significantly increasing manufacturing costs. Conventional approaches to this problem are generally limited to the use of bulkier receivers and/or slower linear speeds and/or shallower depths of cut. However, these approaches are associated with various disadvantages, such as reduced maneuverability of the machining equipment as well as restricted access to the workpiece.

A "walk-out" phenomenon will now be briefly discussed without being restricted to any particular theory. Prior to introduction of lateral forces between a shank and a receiver during, e.g., a milling operation, an inside wall of the receiver contacts the shank circumferentially and uniformly, maintaining static friction between the shank and the receiver and retaining the shank within the receiver. When lateral forces are introduced, the receiver may locally elastically deform, resulting in a loss of static friction between the shank and the receiver. As a result, slippage of the shank relative to the receiver may occur.

SUMMARY

Accordingly, apparatuses and methods, intended to address at least the above-identified concerns, would find utility.

The following is a non-exhaustive list of examples, which may or may not be claimed, of the subject matter according the present disclosure.

One example of the present disclosure relates to a shank comprising a captive portion comprising a longitudinal central axis. The shank also comprises a captive end, a first set of first structures, and a second set of second structure. The first structures extend away from the longitudinal central axis in a direction normal to the longitudinal central axis. The second structures extend away from the longitudinal central axis in a direction normal to the longitudinal central axis. The first set of the first structures and the second set of the second structures are each half as long along the longitudinal central axis as the captive portion. The first set of the first structures and the second set of the second structures do not overlap along the longitudinal central axis. The second set of the second structures is closer to the captive end than the first set of the first structures. The first set of the first structures has a first axial compliance coefficient along the longitudinal central axis. The second set of the second structures has a second axial compliance coefficient along the longitudinal central axis. The first axial compliance coefficient of the first set of the first structures is greater than the second axial compliance coefficient of the second set of the second structures.

Another example of the present disclosure relates a shank comprising a captive portion comprising a longitudinal central axis. The shank also comprises a captive end, a first set of first structures, and a second set of second structures. The first structures extend away from the longitudinal central axis in a direction normal to the longitudinal central axis. The second structures extend away from the longitudinal central axis in a direction normal to the longitudinal central axis. The first set of the first structures and the second set of the second structures are indirectly connected together.

Yet another example of the present disclosure relates to a method of forming a shank. The method comprises arranging first structures in a first set of the first structures and second structures in a second set of the second structures such that the first structures and the second structures extend away from a longitudinal central axis in a direction normal to the longitudinal central axis. The method also comprises indirectly bonding the first set of the first structures to the second set of the second structures.

BRIEF DESCRIPTION OF THE DRAWINGS

Figure 1:
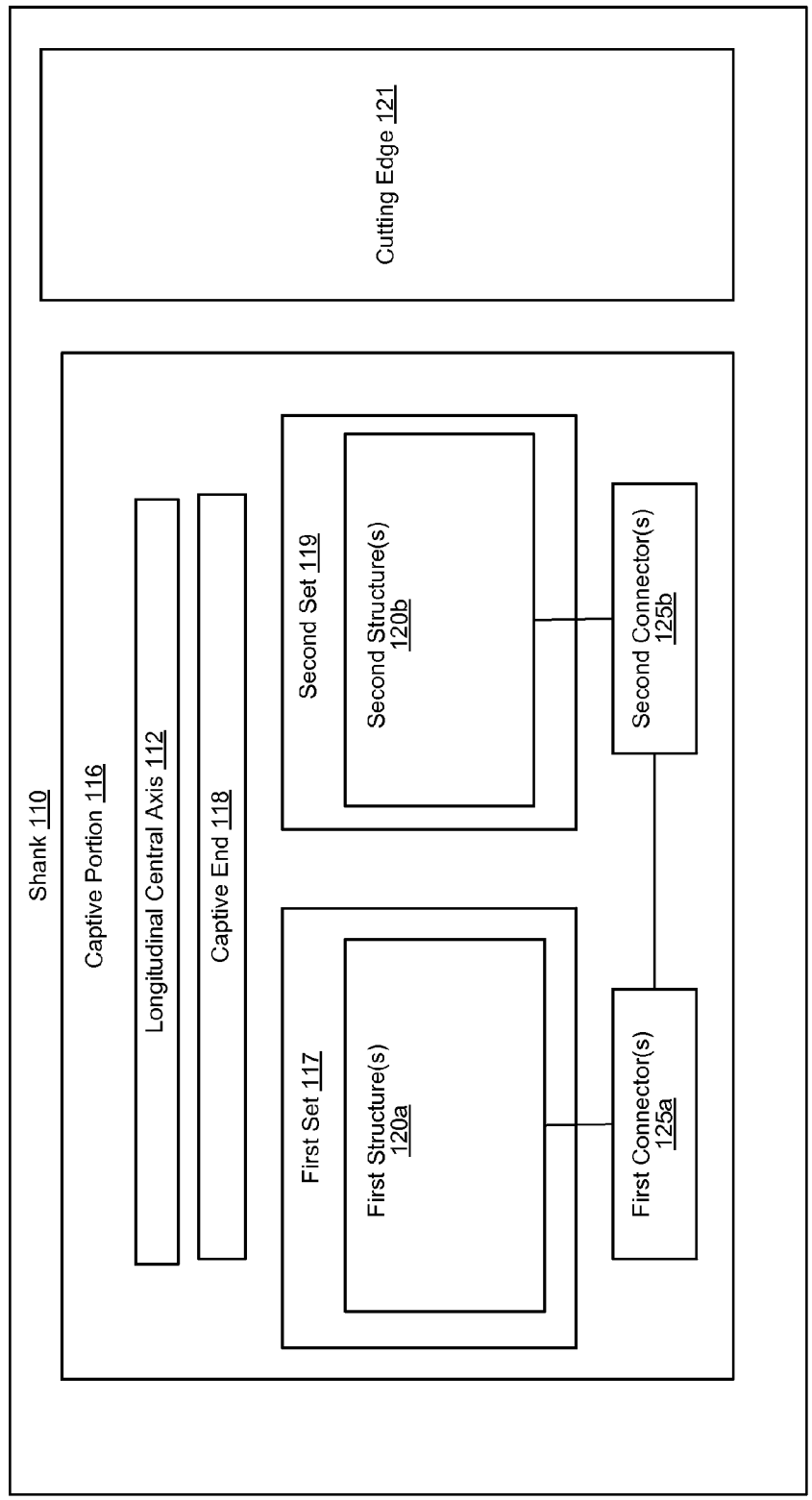
Figure 2A:
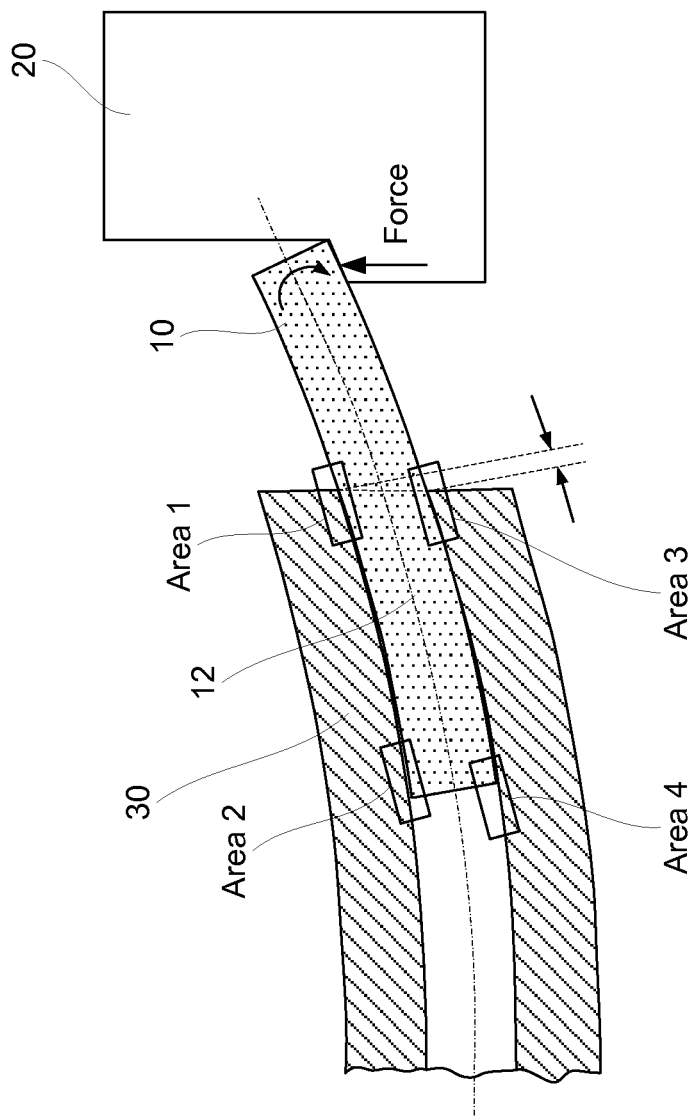
Figure 2B:
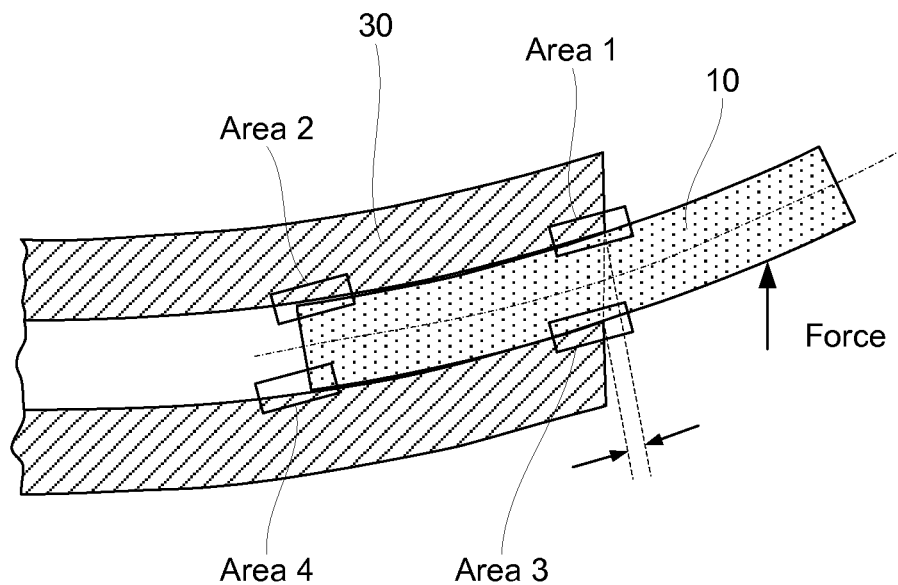
Figure 2C:
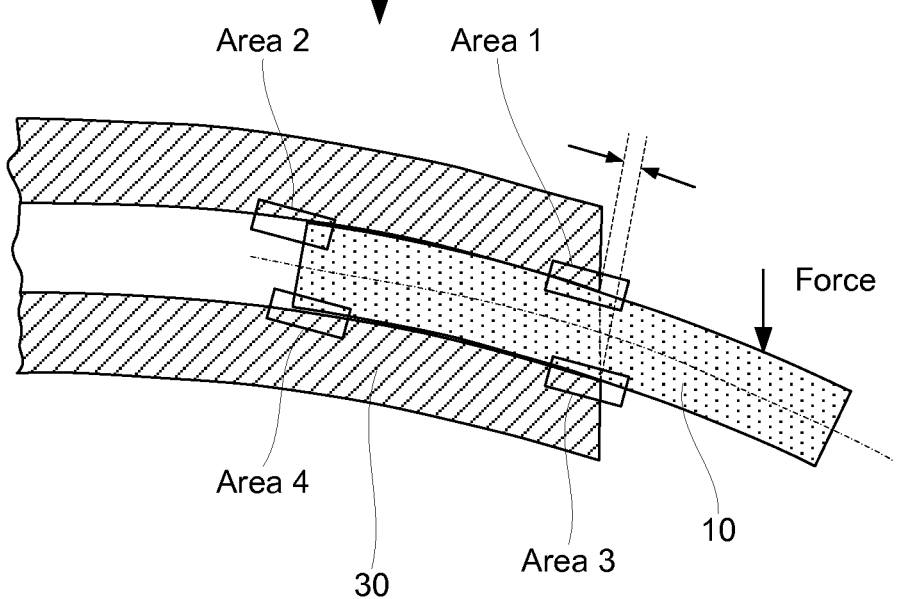
Figure 4A:
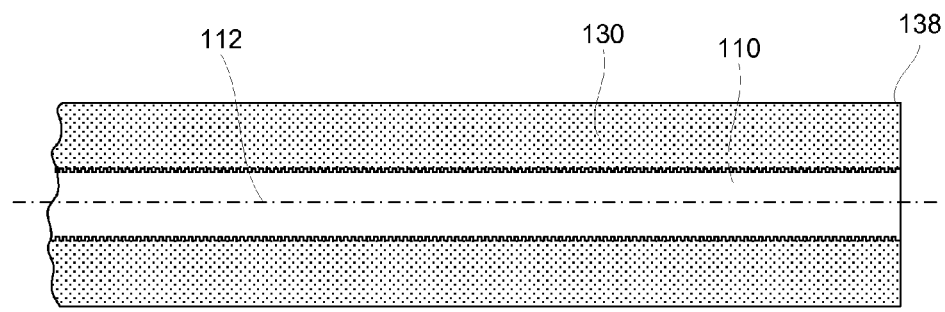
Figure 4B:
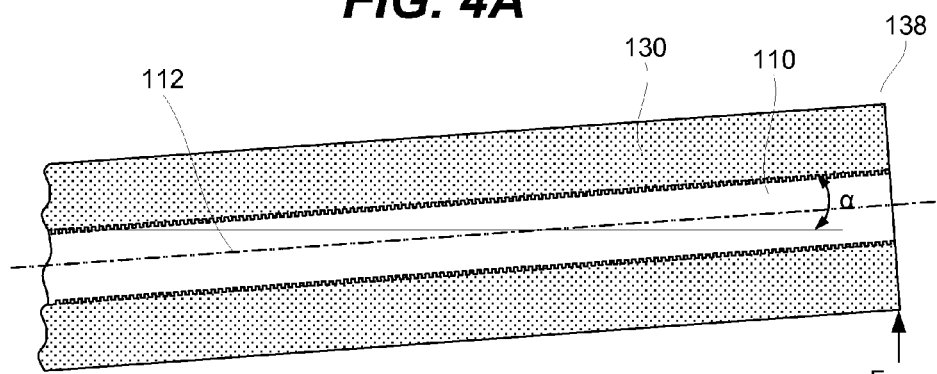
Figure 4C:
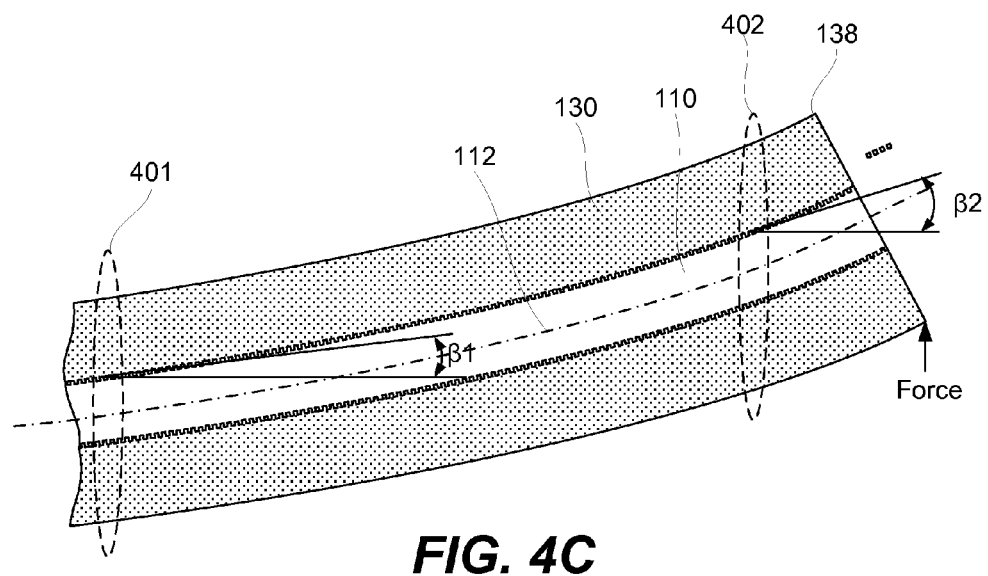
Figure 7A:
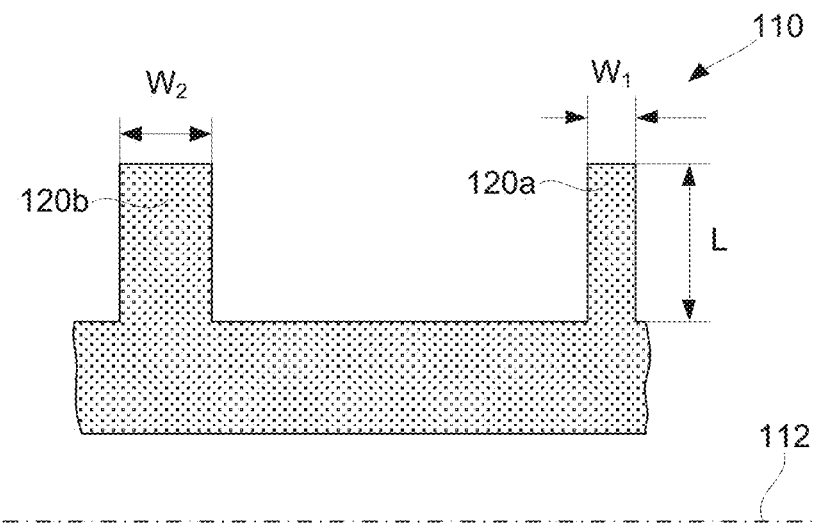
Figure 7B:
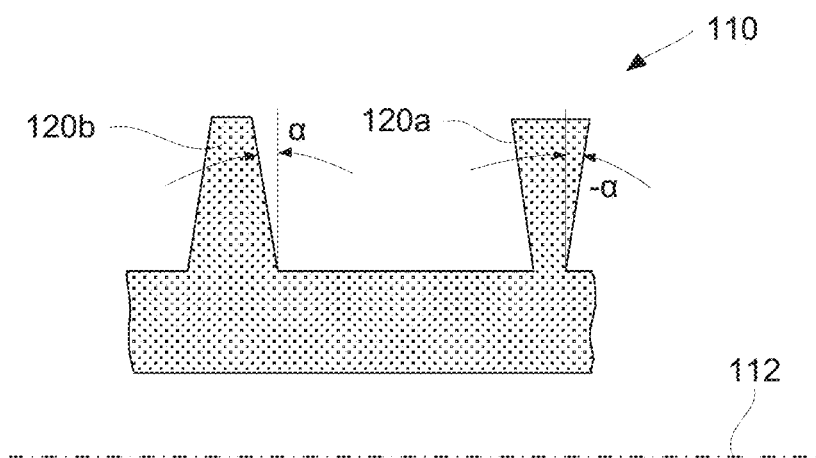
Figure 7C:
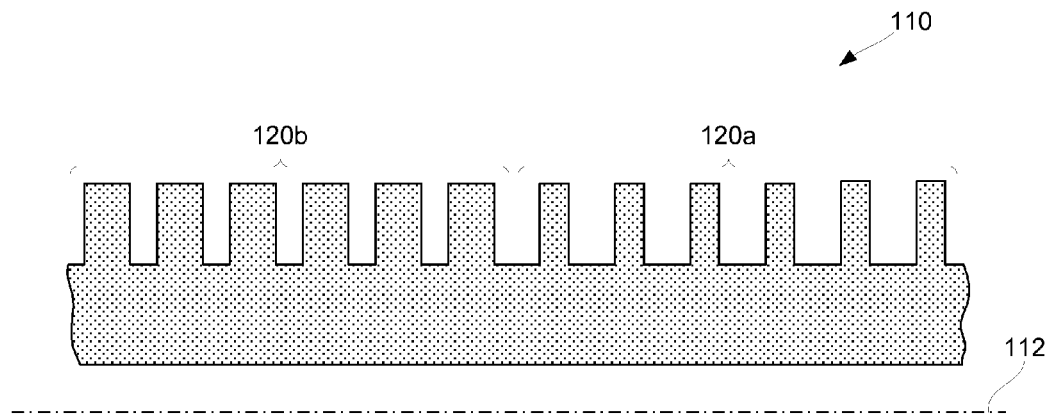
Figure 7D:
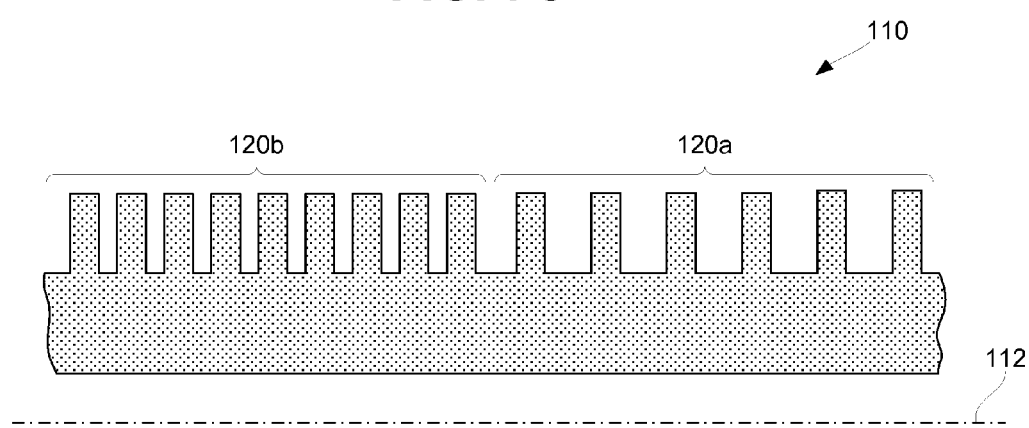
Figure 7E:
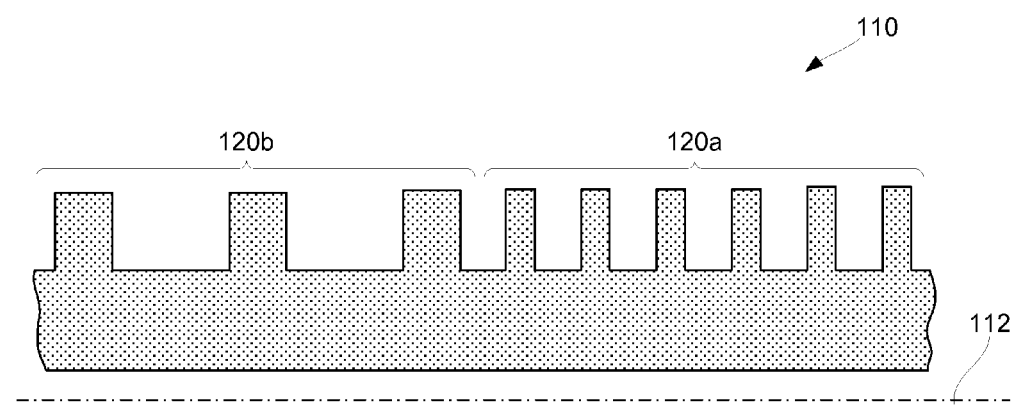
Figure 10:
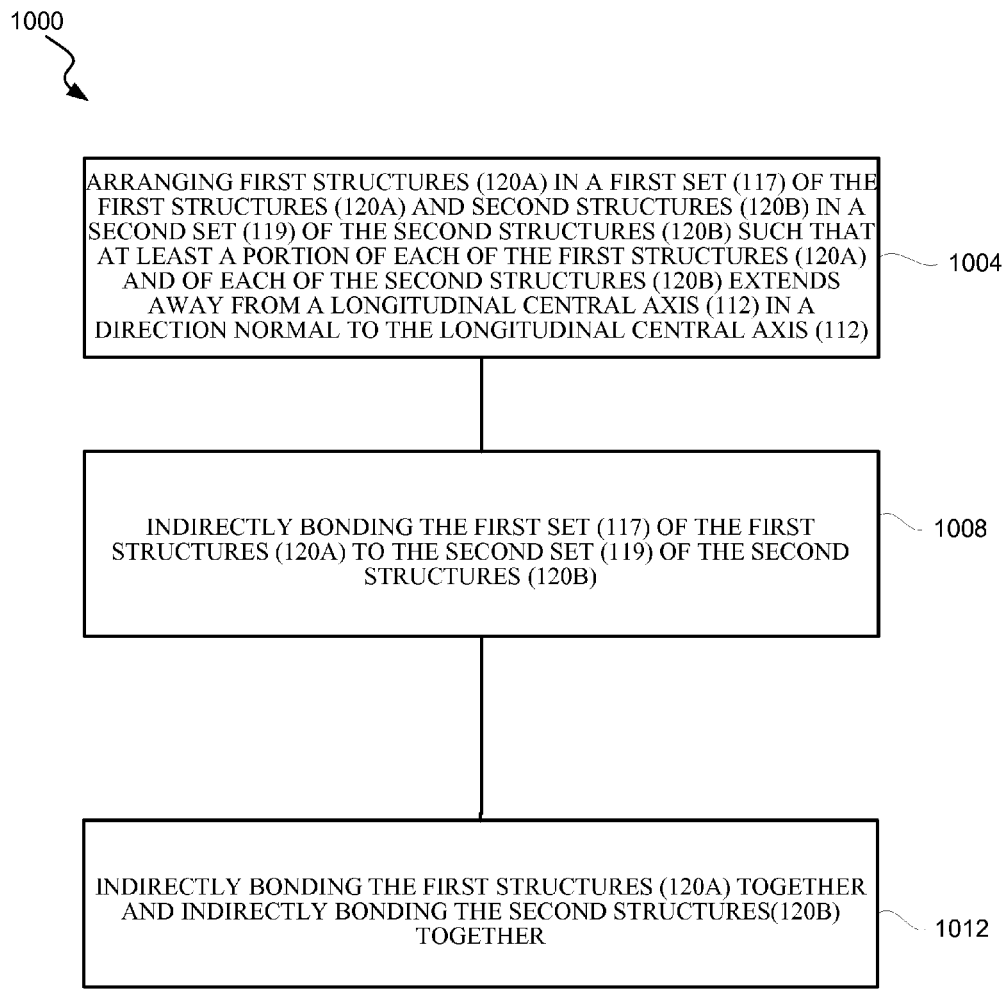
Figure 11:
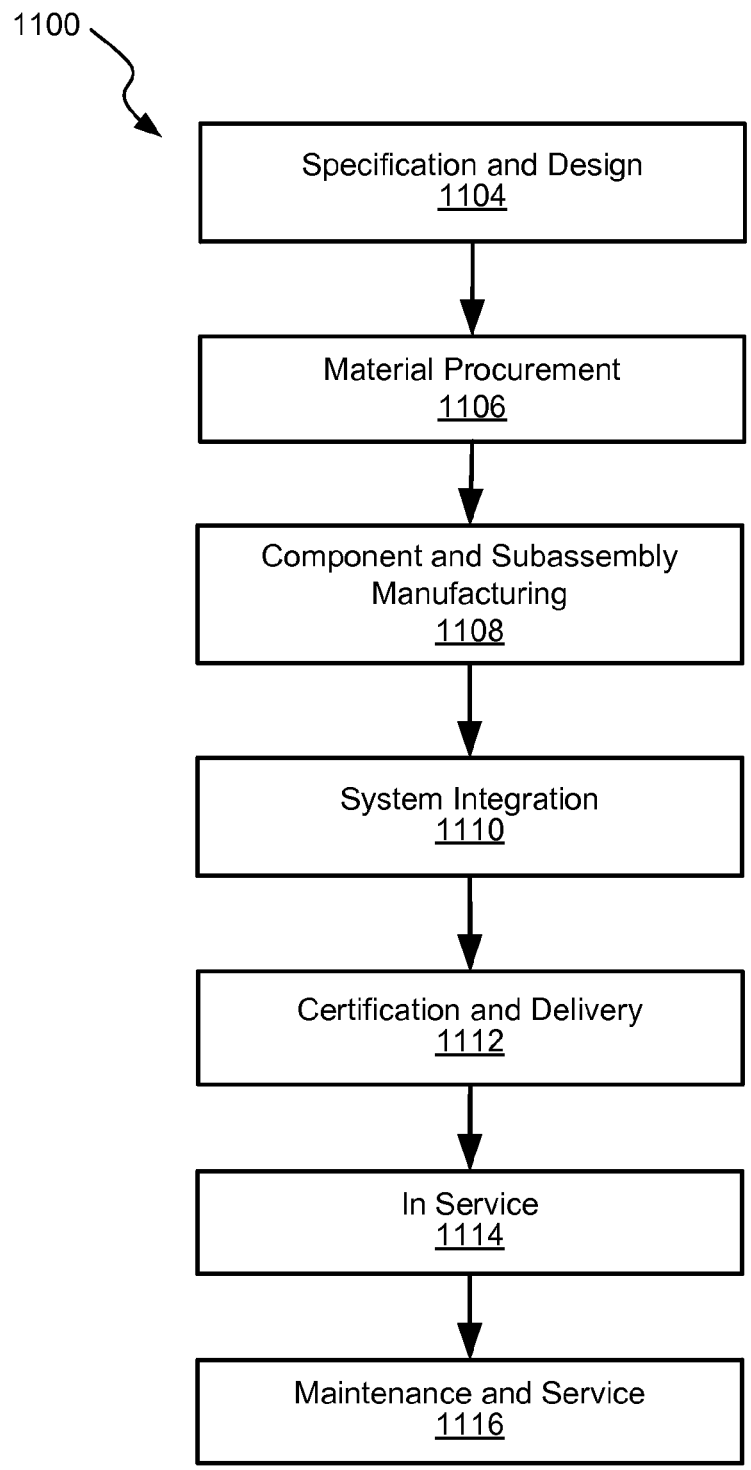

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a shank, according to one or more examples of the present disclosure;

FIG. 2A is a schematic sectional view of a rotating receiver-and-shank assembly subjected to a lateral force;

FIG. 2B is a schematic sectional view of the rotating receiver-and-shank assembly of FIG. 2A with the lateral force in a first orientation relative to the assembly;

FIG. 2C is a schematic sectional view of the rotating receiver-and-shank assembly of FIG. 2A with the lateral force in a second orientation relative to the assembly;

FIG. 3A is a schematic sectional view of a receiver-and-shank assembly, in which neither the receiver nor the shank has structural for increasing axial compliance, prior to applying a lateral force to the shank;

FIGS. 3B-3D are schematic sectional views of the receiver-and-shank assembly of FIG. 3A, wherein the shank is subjected to a lateral force applied in two different orientations relative to the shank;

FIG. 3E is a schematic sectional view of a shank having structures, according to one or more examples of the present disclosure, having structures engaging a receiver, prior to applying a lateral force to the shank;

FIGS. 3F-3H are schematic sectional views of the shank of FIG. 3E, according to one or more examples of the present disclosure, having the structures engaging the receiver, as shown in FIG. 3E, wherein the shank is subjected to a lateral force applied in two different orientations relative to the shank;

FIG. 4A is a schematic sectional view of a receiver-and-shank assembly that is not deformed and/or subjected to a lateral force;

FIG. 4B is a schematic sectional view of a receiver-and-shank assembly exhibiting a constant-angle deformation due to, for example, being subjected a lateral force;

FIG. 4C is a schematic sectional view of a receiver-and-shank assembly exhibiting a variable-angle deformation, due to, for example, being subjected a lateral force;

FIGS. 5A-5B and 6A-6B are schematic sectional views of two portions of the receiver shown in FIG. 4C at two different angle deformations;

FIG. 7A is a schematic sectional view of the shank of FIG. 1, comprising two structures having different widths, according to one or more examples of the present disclosure;

FIG. 7B is a schematic sectional view of the shank of FIG. 1, comprising two structures having different camber angles, according to one or more examples of the present disclosure;

FIG. 7C is a schematic sectional view of the shank of FIG. 1, in which the first structures and the second structures have identical combined lengths but different combined widths, according to one or more examples of the present disclosure;

FIG. 7D is a schematic sectional view of the shank of FIG. 1, in which the first structures have a smaller combined length than the second structures, according to one or more examples of the present disclosure;

FIG. 7E is a schematic sectional view of the shank of FIG. 1, in which the first structures have a greater combined length than the second structures but in which the first structures and the second structures have identical combined widths, according to one or more examples of the present disclosure;

FIG. 8A is a schematic sectional view of the shank of FIG. 1, according to one or more examples of the present disclosure, and a receiver prior to fitting the shank into the receiver;

FIG. 8B is a schematic sectional view of the shank shown in FIG. 8A, according to one or more examples of the present disclosure;

FIG. 9A is a schematic sectional view of structures of the shank of FIG. 1, according to one or more examples of the present disclosure, prior to connecting the structures;

FIG. 9B is a schematic sectional view of the shank of FIG. 1, according to one or more examples of the present disclosure, after connecting the structures shown in FIG. 9A;

FIG. 10 is a block diagram of a method of forming the shank of FIG. 1, according to one or more examples of the present disclosure;

FIG. 11 is a block diagram of aircraft production and service methodology; and

Figure 12:
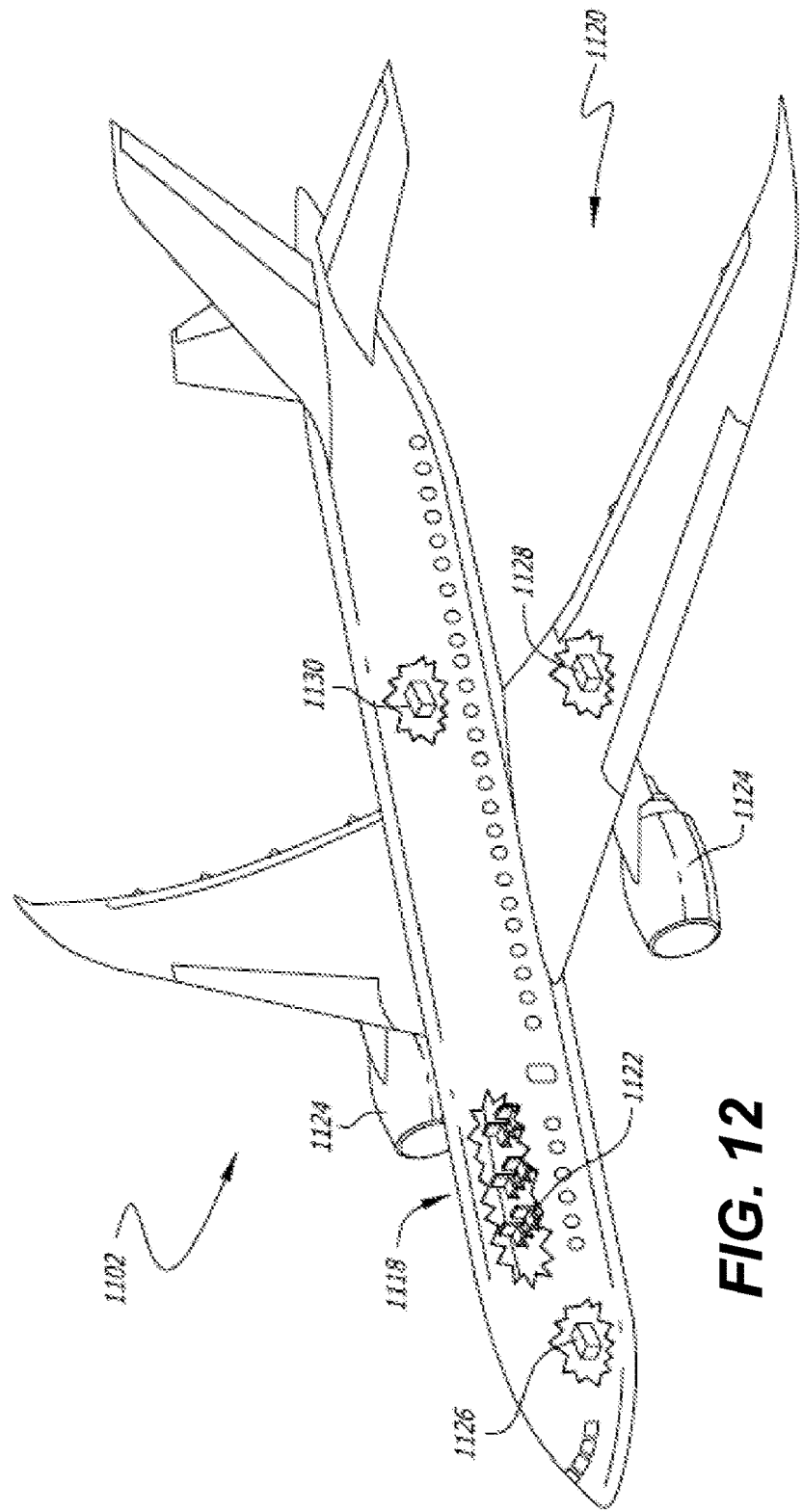

FIG. 12 is a schematic illustration of an aircraft.

DETAILED DESCRIPTION

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 10 and 11, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 10 and 11 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

Referring, e.g., to FIGS. 1, 8A, 8B, 9A, and 9B, shank 110 is disclosed. Shank 110 comprises captive portion 116, comprising longitudinal central axis 112. Shank 110 also comprises captive end 118, first set 117 of first structures 120a, and second set 119 of second structures 120b. First structures 120a extend away from longitudinal central axis 112 in a direction normal to longitudinal central axis 112. Second structures 120b extend away from longitudinal central axis 112 in a direction, normal to longitudinal central axis 112. First set 117 of first structures 120a and second set 119 of second structures 120b are each half as long along longitudinal central axis 112 as captive portion 116. First set 117 of first structures 120a and second set 119 of second structures 120b do not overlap along longitudinal central axis 112. Second set 119 of second structures 120b is closer to captive end 118 than first set 117 of first structures 120a. First set 117 of first structures 120a has a first axial compliance coefficient along longitudinal central axis 112. Second set 119 of second structures 120b has a second axial compliance coefficient along longitudinal central axis 112. The first axial compliance coefficient of first set 117 of first structures 120a is greater than the second axial compliance coefficient of second set 119 of second structures 120b. The preceding subject matter of this paragraph characterizes example 1 of the present disclosure.

The first axial compliance coefficient being greater than the second axial compliance coefficient allows first structures 120a to bend more than second structures 120b when the same axial force (i.e., the force along longitudinal central axis 112) is applied to each of first set 117 of first structures 120a and second set 119 of second structures 120b. More specifically, when the same axial force is applied to the ends of first structures 120a and to the ends of second structures 120b, first structures 120a will bend more along longitudinal central axis 112 than of second structures 120b. This bending difference is relied on to avoid exceeding static friction between the ends of first structures 120a and to the ends of second structures 120b and a structure which these ends engage. For example, shank 110 may be retained in the receiver. If static friction is not lost, shank 110 will not walk out of receiver. Without being restricted to any particular theory, it is believed that during operation of shank 110, shank 110 experiences less angular deformation closer to captive end 118 than further away from captive end 118 such as the opposite end of captive portion 116. This difference in angular deformations results is further described below with references to FIGS. 2A-2C, 3A-3H, 4A-4C, 5A-5B, and 6A-6B.

As used herein, a longitudinal central axis is a line (which may or may not be straight) passing through the centroid of each cross-section of an object, where the centroid (geometric center) of a two-dimensional region is the arithmetic-mean or "average" position of all the points in the two-dimensional region.

FIG. 2A is a schematic sectional view of receiver 30 supporting shank 10, which is subjected to a lateral force while being rotated. The lateral force may be a result of moving shank 10, which may be an end mill, for example, in a lateral direction and forcing shank 10 against workpiece 20. As a result of this lateral force, which may be defined as any force in a direction formal to longitudinal central axis 12, the coupling between receiver 30 and shank 10 may be impacted. In this example, compression in area 1 may be greater than compression in area 3, while compression in area 2 may less than compression in area 2. These compressions are defined as a force with which receiver 30 compresses on shank 10 and vice versa. This difference in compression may result in slip conditions in areas 2 and 3 due to the loss in static friction and various axial forces in the identified area. When the slip occurs, a portion of shank 10 extends from receiver in area 3 as shown in FIG. 2A. As receiver 30 rotates around its longitudinal central axis 12 the locations of area 1 and area 3 interchange with additional portions of shank 10 slipping out of receiver 30 at every turn. This phenomenon may be referred to as "walk out". A similar phenomenon occurs for when receiver 30 and longitudinal central axis 12 vibrate with respect to each other in a direction along the lateral force, which may be perpendicular to longitudinal central axis 12. This example is illustrated in FIGS. 2B and 2C.

FIGS. 3A-3D and, separately, FIGS. 3E-3H illustrate that adding structures to a shank increases the axial compliance of the shank along its longitudinal central axis and helps to reduce or completely mitigate the "walk out" phenomenon described above. Specifically, FIGS. 3A-3D illustrate receiver 30 engaging shank 10 without any structures either on receiver 30 or shank 10. While receiver 30 and shank 10 have some axial compliance due to the elastic deformation of receiver 30 and shank 10, this compliance has proved to be insufficient to prevent the "walk out" phenomenon for many applications and operating conditions.

FIG. 3A illustrates a state before applying any lateral forces. In this state, first receiver reference point 31a is aligned with first shank reference point 11a. Separately, second receiver reference point 31b is aligned with second shank reference point 11b.

FIG. 3B illustrates a state when a lateral force is first applied in the direction from first shank reference point 11a to second shank reference point 11b. As described above with reference to FIG. 1A, this force may cause a slip of shank 10 with respect to receiver 30 such that first shank reference point 11a may move to the left from first receiver reference point 31a and become misaligned as shown in FIG. 3B. This slip may result in first shank reference point 11a being forced away from first receiver reference point 31a and loss of static friction between first shank reference point 11a and first receiver reference point 31a. The elastic deformation of shank 10 and receiver 30 may be another contributing factor. Second receiver reference point 31b may remain aligned with second shank reference point 11b or at least may slip less than first shank reference point 11a relative to first receiver reference point 31a.

FIG. 3C illustrates a state in which shank 10 and receiver 30 experience a force in an opposite direction relative to the state shown in FIG. 3B. This change in the force orientation may be due to the vibration of shank 10 and receiver 30 or due to the rotation of shank 10 and receiver 30. As shown in FIG. 3C, the force is now directed from second shank reference point 11b to first shank reference point 11a. This force may cause a slip of shank 10 with respect to receiver 30 such that second shank reference point 11b now may move to the left from second receiver reference point 31b and become misaligned. This slip may result in second shank reference point 11b being forced away from second receiver reference point 31b and loss of static friction between second shank reference point 11b and second receiver reference point 31b. The elastic deformation of shank 10 and receiver 30 may be another contributing factor. The relative position of first receiver reference point 131a to first shank reference point 11a may remain or at least may change less than the relative position of second shank reference point 11b and second receiver reference point 31b. It should be noted that in this state first shank reference point 11a may not move back into its original position relative to first receiver reference point 31a shown in FIG. 3A. As such, on average, shank 10 extends further out of receiver 30 as this assembly moves from the state shown in FIG. 3A to the state shown in FIG. 3B and then to the state shown in FIG. 3C, and so on.

FIG. 3D illustrates a state in which shank 10 and receiver 30 experience a force in an opposite direction relative to the state shown in FIG. 3C. This direction is the same as shown in FIG. 3B. This force may cause a further slip of shank 10 with respect to receiver 30 such that first shank reference point 11a may move further to the left from first receiver reference point 31a in comparison to the orientations of first shank reference point 11a and first receiver reference point 31a shown in FIGS. 3B and 3C.

FIGS. 3E-3H illustrate shank 110 having structures that are engaged by receiver 130. These structures have an axial compliance coefficient, which may be much greater that the axial compliance coefficient a similar shank without such structures. With this high axial compliance coefficient, the structures can bend and help to prevent the loss of static friction.

FIG. 3E illustrates a state before applying any lateral forces. In this state, first receiver reference point 131a is aligned with first shank reference point 111a. Separately, second receiver reference point 131b is aligned with second shank reference point 111b. The structures may extend in a direction substantially normal to longitudinal central axis 112.

FIG. 3F illustrates a state when a lateral force is first applied in the direction from first shank reference point 111a to second shank reference point 111b. This force may cause first shank reference point 111a to move to the left from its original position shown in FIG. 3E. However, the structures of shank 110 will bend and move in the same direction and by the same amount. As such, first shank reference point 111a remains aligned with respect to first receiver reference point 131a. Second receiver reference point 131b also remains aligned with second shank reference point 111b.

FIG. 3G illustrates a state in which shank 110 and receiver 130 experience a force in an opposite direction relative to the state shown in FIG. 3F. This change in the force orientation may be due to the vibration of shank 110 and receiver 130 or due to the rotation of shank 110 and receiver 130. As shown in FIG. 3G, the force is now directed from second shank reference point 111b to first shank reference point 111a. This force may cause second shank reference point 111b to move to the left from its original position shown in FIG. 3E and from the position shown in FIG. 3F. However, the structures of shank 110 will bend and move in the same direction and by the same amount. As such, second shank reference point 111b remains aligned with respect to second receiver reference point 131b. First receiver reference point 131a also remains aligned with first shank reference point 111c. As such, while on average, shank 110 extends further out of receiver 130 as in the state shown in FIGS. 3F and 3G in comparison to FIG. 3E, the extension processes effectively stops once the force is initially applied. In other words, moving from the state shown in FIG. 3F to the state shown in FIG. 3G, does not further extend shank 110 out of receiver 130, at least on average.

FIG. 3H illustrates a state in which shank 110 and receiver 130 experience a force in an opposite direction relative to the state shown in FIG. 3G. This direction is the same as shown in FIG. 3F. This force may cause first shank reference point 111a to move to the left from its original position shown in FIGS. 3E and 3G. However, the structures of shank 110 will bend and move in the same direction and by the same amount. As such, first shank reference point 111a remains aligned with respect to first receiver reference point 131a. Second receiver reference point 131b also remains aligned with second shank reference point 111b. The state shown in FIG. 3H is effectively the same as the state shown in FIG. 3F.

Various bending examples of shank 110 and receiver 130 will now be described with reference to FIGS. 4A-4C. FIG. 4A is a schematic section view of shank 110 and receiver 130 that is not bend (e.g., not subjected to any lateral force). FIG. 4B is a schematic section view of shank 110 and receiver 130 subjected exhibiting a constant bend angle (identified as $\alpha$) along longitudinal central axis 112. This example may correspond to bending of shank 110 and receiver 130 at a single point along longitudinal central axis 112 and presented as a reference only. Without being restricted to any particular theory, it is believed that this example may not represent the actual bending condition when a lateral force is applied to shank 110.

FIG. 4C is a schematic section view of shank 110 and receiver 130 subjected exhibiting a variable angle deformation. This example may correspond to bending of shank 110 and receiver 130 over multiple points along longitudinal central axis 112 or even over the entire length of shank 110 and receiver 130 along longitudinal central axis 112. Specifically, the bend angle (identified as ($\beta2$) is greater in area 402 near receiving end 138 than the bend angle (identified as ($\beta1$) in area 401 farther away from receiving end 138 than area 402. It should be noted that receiving end 138 of receiver 130 is aligned with the end of captive portion 116 of shank 110 opposite of captive end 118. It should be also noted that bending of shank 110 and receiver 130 along longitudinal central axis 112 may be uniform (e.g., a constant increase over a different length along longitudinal central axis 112) or non-uniform (e.g., a variable increase over a different length along longitudinal central axis 112). Both uniform and non-uniform bending may produce different bend angles as these angles identified in FIG. 4C. Effects of bend angles $\beta1$ and $\beta2$ being different in areas 401 and 402 will now be described with reference to FIGS. 5A-5B and 6A-6B. For clarity, the structures enhancing the axial compliance of shank 110 are not shown in FIGS. 5A-5B and 6A-6B.

FIG. 5A is a schematic section view of area 401 having bend angle $\beta1$. Various points have been identified in this view for illustration, such as point A (element 420), point B (element 422), point C (element 424), point D (element 426), point E (element 428), and point F (element 430). Some of this points are also shown in FIG. 5B, which is expanded view of a portion of area 401. The same points are also shown in FIGS. 6A and 6B. As shank 110 and receiver 130 deforms by bend angle $\beta1$, a corner initially corresponding to point D moves to the position corresponding to point B. Bend angle $\beta1$ may be also presented as angle DAB. In this example, line BC extends perpendicular to line AC (or line AD). As such, angle CBD is equal to bend angle $\beta1$ based on equivalence of triangles CAD and CBD. The extension distance in this example is shown as EF, which depends on angle CBD and, as a result, on bend angle $\beta1$. When the bend angle increases, e.g., moving from bend angle $\beta1$ shown in FIGS. 5A-5B to bend angle $\beta2$ shown in FIGS. 6A-6B, the extension distance also increases. As such, the extension distance varies along longitudinal central axis 112 of interior space 136. If slip is allowed, as in conventional assemblies, slip distances will be also different along longitudinal central axis 112 and may generally correspond to the extension distances shown in FIGS. 4, 5A-5B, and 6A-6B.

In order to accommodate different extension distances along longitudinal central axis 112 without causing the slip (e.g., exceeding static friction), structures of shank 110 may have different axial compliance coefficients along longitudinal central axis 112. For purposes of this disclosure, an axial compliance coefficient is defined as structure's ability to bend when an axial force is applied to the end of this structure. During operation of shank 110, this end of the structure may be compressed against another surface, such as receiver 130, which may apply the axial force to these ends. The axial force is applied along longitudinal central axis 112, which may be perpendicular to the lengths of the structures (at least prior to bending the structures). It should be noted that various other forced (in other directions) may act on the structure at the same time.

A larger axial compliance coefficient allows the structure to bend more without losing static friction with a surface, against which this structure is pressed. For example, when two structures are pressed against a surface and the surface is slid in a direction substantially normal to the length of these structures, the structure with a smaller axial compliance coefficient will slip (relative to the surface) before the structure with a larger axial compliance coefficient. Specifically, the force between the structure with a smaller axial compliance coefficient and the surface will be greater than the force between the structure with a larger axial compliance coefficient and the surface for the same degree of bend. As such, the force between the structure with a smaller axial compliance coefficient and the surface will exceed static friction earlier than the structure with a larger axial compliance coefficient. As such, one or more structures with a larger axial compliance coefficient may be positioned in areas where the relative motion between two components (e.g., a receiver and shank) in the axial direction is larger.

First structures 120*a* extend away from longitudinal central axis 112 in a direction normal to longitudinal central axis 112. In some examples, all first structures 120*a* extend in this direction. Alternatively, one or more of first structures 120*a* may extend in a different direction, which is not normal to longitudinal central axis 112. Furthermore, second structures 120*b* extend away from longitudinal central axis 112 in a direction normal to longitudinal central axis 112. In some examples, all second structures 120*b* extend in this direction. Alternatively, one or more of second structures 120*b* may extend in a different direction, which is not normal to longitudinal central axis 112. Those skilled in the art would understand that directions along which first structures 120*a* and second structures 120*b* extend initially (e.g., prior to applying the lateral force) may change during operation of shank 110 (e.g., when the lateral force is applied).

First set 117 of first structures 120*a* and second set 119 of second structures 120*b* are each half as long along longitudinal central axis 112 as captive portion 116. First set 117 of first structures 120*a* and second set 119 of second structures 120*b* do not overlap along longitudinal central axis 112. In other words, first structures 120*a* and second structures 120*b* may be the only such structures of shank 110. Captive portion 116 may be the only portion of shank 110 used to engage another components, such as a receiver. Even though first set 117 of first structures 120*a* and second set 119 of second structures 120*b* have the same length along longitudinal central axis 112, the characteristics (at least the axial compliance coefficients) of these sets are different.

Second set 119 of second structures 120*b* is closer to captive end 118 than first set 117 of first structures 120*a*. Based on the bending model described above with reference to FIGS. 4C, 5A-5B, and 6A-6B, first set 117 of first structures 120*a* may experience greater axial deformation that second set 119 of second structures 120*b* due to their relative locations. Because of that first set 117 of first structures 120*a* has a greater axial compliance coefficient than second set 119 of second structures 120*b*. More specifically, first set 117 of first structures 120*a* has a first axial compliance coefficient along longitudinal central axis 112 of interior space 136. Second set 119 of second structures 120*b* has a second axial compliance coefficient along longitudinal central axis 112 of interior space 136. The first axial compliance coefficient of first set 117 of first structures 120*a* is greater than the second axial compliance coefficient of second set 119 of second structures 120*b*. As such, first set 117 of first structures 120*a* may be easier to bend than second set 119 of second structures 120*b*. When the same force along longitudinal central axis 112 is applied to each set of structures (i.e., to the ends of first structures 120*a* and, separately, to the ends of second structures 120*b*), first structures 120*a* will bend more than second structures 120*b* on average. As such, for the same level of static friction, first structures 120*a* can bend more than second structures 120*b* before slipping. This axial compliance coefficient difference will help preventing slip conditions at the end of captive potion opposite of captive end 118 where the extension distance may be greater as described above with reference to FIGS. 4C, 5A-5B, and 6A-6B.

Referring generally to FIGS. 1, 8A, 8B, 9A, and 9B, and particularly to, e.g., FIGS. 8B, 9A, and 9B, first set 117 of first structures 120*a* and second set 119 of second structures 120*b* are indirectly connected together. The preceding subject matter of this paragraph characterizes example 2 of the present disclosure, wherein example 2 includes the subject matter of example 1, above.

Indirectly connecting of first set 117 of first structures 120*a* and second set 119 of second structures 120*b* supports these sets with respect to each other, thereby maintaining mechanical and functional integrity of shank 110. Furthermore, this indirect connection allows transferring loads (e.g., forces and torques) between first set 117 of first structures 120*a* and second set 119 of second structures 120*b*. For example, second set 119 of second structures 120*b* is closer to captive end 118 and may be indirectly connected to first set 117 of first structures 120*a*, which also connect second set 119 of second structures 120*b* to other components of shank 110, such as cutting edge 121.

Indirectly connecting first set 117 of first structures 120*a* and second set 119 of second structures 120*b* may be a result of first set 117 of first structures 120*a* and second set 119 of second structures 120*b* being monolithic. For example, all first structures 120*a* and all second structures 120*b* may be made from the same starting block of material. This type of shank 110 does not need a separate bonding operation during its fabrication, may be stronger than shank 110 formed using various bonding techniques, but may be more difficult to fabricate. Alternatively, one of first structures 120*a*, which is immediately adjacent to second set 119 of second structures 120*b*, may be monolithic with one of second structures 120*b*, which is immediately adjacent to first set 117 of first structures 120*a*. For example, the end structure of first set 117 of first structures 120*a* and the adjacent end structure of second set 119 of second structures 120*b* may be made of the same starting block of material. One or more other structures of first set 117 of first structures 120*a* and/or of second set 119 of second structures 120*b* may be indirectly bonded to this monolithic center portion using one or more bonding techniques. Furthermore, one of first structures 120*a*, which is immediately adjacent to second set 119 of second structures 120*b*, and one of second structures 120*b*, which is immediately adjacent to first set 117 of first structures 120*a*, may be indirectly connected to each other using one or more bonding techniques. These structures may be supported by connectors, and these two connectors may be directly connected to each other. Some examples of such bonding techniques include welding (using, e.g., a gas flame, an electric arc, a laser, an electron beam, friction, and ultrasound), diffusion bonding, adhesive bonding, mechanical coupling, and the like.

FIGS. 9A and 9B schematically illustrate an example of indirect connections of first set 117 of first structures 120*a* and second set 119 of second structures 120*b*. One of first structures 120*a* may be an end structure of first set 117 of first structures 120*a* and may be adjacent to second set 119 of second structures 120*b*. Each one of first structures 120*a* may be supported by one of first connectors 125*a*, as shown in FIGS. 9A and 9B. First structure 120*a* and first connector 125*a* may both have annular shapes. One of second structures 120*b* may be an end structure of second set 119 of second structures 120b and may be adjacent to first set 117 of first structures 120a. Each one of second structures 120b may be supported by one of second connectors 125b. Second structures 120b and second connectors 125b may both have annular shapes.

One of first structures 120a (an end structure of first set 117 of first structures 120a) may be indirectly connected to one of second structures 120b (an end structure of second set 119 of second structures 120b) via one of first connectors 125a and one of second connectors 125b. For example, first connector 125a and second connector 125b may be directly bonded to each other using one of suitable bonding techniques. First structure 120a and first connector 125a may be monolithic or directly bonded to each other. Second structure 120b and second connector 125b may be monolithic or directly bonded to each other. In some examples, first connector 125a may be monolithic with second connector 125b, while first structure 120a and second structure 120b may be directly bonded to first connector 125a and second connector 125b, respectively, using one or more bonding techniques. It should be noted that while first connector 125a and second connector 125b may directly contact each other, first structure 120a and second structure 120b are spaced apart from each other even though first structure 120a may be indirectly connected to second structure 120b.

Referring generally to FIGS. 1, 8A, 8B, 9A, and 9B, and particularly to, e.g., FIG. 8B, first structures 120a are indirectly connected together and second structures 120b are indirectly connected together. The preceding subject matter of this paragraph characterizes example 3 of the present disclosure, wherein example 3 includes the subject matter of example 2, above.

Structures may be indirectly connected together within each set (e.g., first structures 120a are indirectly connected together via first connectors 125a, and, similarly, second structures 120b are indirectly connected together via second connectors 125b) to ensure mechanical and functional integrity of that set of structures. Furthermore, this indirect connection may allow transferring various loads between the structures within the set (e.g., through their connectors that may be directly connected as, for example, described above with reference to FIGS. 9A and 9B). In some examples, the indirect connection between the structures of the set may also impact the axial compliance coefficient of the structures. Without being restricted to any particular theory, it is believed that indirect connection of the structures within a set may reduce the axial compliance coefficient of that set of structures in comparison to a similar set in which the structures are not connected to each other.

Indirect connection among first structures 120a and/or among second structures 120b may be the result of the structures in one or both sets of structures being monolithic. In some examples, structures within one set may be separate components that are indirectly bonded together (e.g., via their connectors) using one or more bonding techniques. Some examples of such techniques include welding (using, e.g., a gas flame, an electric arc, a laser, an electron beam, friction, and ultrasound), diffusion bonding, adhesive bonding, mechanical coupling, and the like. Having separate structures that are later indirectly bonded into a set allows, in some examples, using structures with different material compositions, shapes, and/or other features that may be more difficult or impossible to achieve with monolithic sets of structures.

Referring generally to FIGS. 1, 8A, 8B, 9A, and 9B, and particularly to, e.g., FIG. 8B, first set 117 of first structures 120a and second set 119 of second structures 120b are diffusion bonded together indirectly. The preceding subject matter of this paragraph characterizes example 4 of the present disclosure, wherein example 4 includes the subject matter of any one of examples 1-3, above.

Diffusion bonding introduces minimal residual stress, plastic deformation, and may be suitable for materials that cannot be bonded by other techniques (e.g., by liquid fusion). As such, diffusion bonding may preserve the geometry and orientations of first structures 120a in first set 117 and second structures 120b in second set 119 when first structures 120a in first set 117 and second structures 120b in second set 119 are diffusion bonded together indirectly. Furthermore, diffusion bonding allows using different materials for first structures 120a in first set 117 in comparison to materials of second structures 120b in second set 119 when, for example, first structures 120a are monolithic with their connectors and second structures 120b are monolithic with their connectors.

Diffusion bonding is a solid-state welding technique capable of joining similar and dissimilar metals based on solid-state diffusion. Diffusion bonding may involve compressing surfaces of two components at high temperatures resulting in atoms of a first component to diffuse into the second component (e.g., driven by the concentration gradient) and atoms of the second component to diffuse into the first component.

When first set 117 of first structures 120a and second set 119 of second structures 120b are diffusion bonded together indirectly, adjacent end structures of first set 117 of first structures 120a and of second set 119 of second structures 120b may be diffusion bonded together to each other indirectly. More specifically, these structures may be supported by connectors, and these two connectors may be diffusion bonded to each other directly.

FIGS. 9A and 9B schematically illustrate an example of indirect connections of first set 117 of first structures 120a and second set 119 of second structures 120b. One of first structures 120a may be an end structure of first set 117 of first structures 120a and may be adjacent to second set 119 of second structures 120b. Each first structure 120a may be supported by one of first connectors 125a and may extend from first connector 125a toward longitudinal central axis 112, as shown in FIGS. 9A and 9B. First structure 120a and first connector 125a may both have annular shapes. One of second structures 120b may be an end structure of second set 119 of second structures 120b and may be adjacent to first set 117 of first structures 120a. Each one of second structures 120b may be supported by one of second connectors 125b and may extend from the one of second connectors 125b toward longitudinal central axis 112. One of second structure 120b and a corresponding one of second connectors 125b may both have annular shapes.

One of first structures 120a (an end structure of first set 117 of first structures 120a) may be indirectly connected to one of second structures 120b (an end structure of second set 119 of second structures 120b) via first connector 125a and second connector 125b. For example, first connector 125a and second connector 125b may be directly bonded to each other using one of suitable bonding techniques. First structure 120a and first connector 125a may be monolithic or directly bonded to each other. Second structure 120b and second connector 125b may be monolithic or directly bonded to each other. In some examples, first connector 125a may be monolithic with second connector 125b, while first structure 120a and second structure 120b may be directly bonded to first connector 125a and second connector 125b, respectively, using one or more bonding techniques. It should be noted that while first connector 125a and second connector 125b may directly contact each other, first structure 120a and second structure 120b are spaced apart from each other even though first structure 120a may be indirectly connected to structure 120b.

Referring generally to FIGS. 1, 8A, 8B, 9A, and 9B, and particularly to, e.g., FIG. 8B, first structures 120a are diffusion bonded together indirectly and second structures 120b are diffusion bonded together indirectly. The preceding subject matter of this paragraph characterizes example 5 of the present disclosure, wherein example 5 includes the subject matter of example 4, above.

Diffusion bonding introduces minimal residual stress, plastic deformation, and may be suitable for materials that cannot be bonded by other techniques (e.g., liquid fusion). As such, diffusion bonding may preserve the geometry and orientations of first structures 120a in first set 117 and second structures 120b in second set 119 when first structures 120a are diffusion bonded together indirectly (e.g., through supported of first structures 120a being diffusion bonded directly) and/or when second structures 120b are diffusion bonded together indirectly (e.g., through supported of first structures 120a being diffusion bonded directly). Furthermore, diffusion bonding allows using different materials for first structures 120a in first set 117 in comparison to materials of second structures 120b in second set 119 when, for example, first structures 120a are monolithic with their connectors and second structures 120b are monolithic with their connectors.

Diffusion bonding is a solid-state welding technique capable of joining similar and dissimilar metals based on solid-state diffusion. Diffusion bonding may involve compressing surfaces of two components at high temperatures resulting in atoms of a first component to diffuse into the second component (e.g., driven by the concentration gradient) and atoms of the second component to diffuse into the first component.

When first structures 120a are diffusion bonded together indirectly and second structures 120b are diffusion bonded together indirectly, supports of first structures 120a may be diffusion bonded together directly and/or supports of second structures 120b may be diffusion bonded together directly. In some examples, first structures 120a may be diffusion bonded to their supports, which may be monolithic or bonded together using one or more bonding techniques, such as diffusion bonding. In some examples, second structures 120b may be diffusion bonded to their supports, which may be monolithic or bonded together using one or more bonding techniques, such as diffusion bonding. In some examples, supports of first structures 120a and supports of second structures 120b are monolithic.

Referring generally to FIGS. 8A-8B and 9A-9B, and particularly to, e.g., FIGS. 9A-9B, at least one of first structures 120a is made of a first material. At least one of second structures 120b is made of a second material. The first material is identical to the second material. The preceding subject matter of this paragraph characterizes example 6 of the present disclosure, wherein example 6 includes the subject matter of any one of examples 1-5, above.

Materials of first structures 120a and second structures 120b effect mechanical properties of these structures and sets and, in particular, their axial compliance coefficients. For example, when all structures of both sets are made from the identical material, the difference in the axial compliance coefficients between these two sets may be achieved by different geometries of the structures or some other characteristics. Furthermore, when all structures of both sets are made from the identical material, the entire shank 110 may be monolithic or may be bonded more easily than, for example, when materials of the two sets are different. Alternatively, even though at one of first structures 120a is made from the identical material as at least one of second structures 120b, other structures in these sets may be made from other materials, which may be used to tailor axial compliance coefficients of the sets and individual structures within the sets.

For purposes of these disclosure, the materials of different structures are identical when material composition, morphology (e.g., crystallinity), and other material characteristics of these structure are identical (or vary by less than 1%, for example). It should be noted that the structures (made from the identical materials) may still have different size, shape, and other geometric characteristics. In some examples, all first structures 120a are made of the first material. Furthermore, all second structures 120b are made of the second material. In other words, all structures of shank 110 are made from the identical material. Some examples of the first material and second material include titanium (e.g., for weight reduction, allowing for rapid changes in the rotational speed of the shank, preventing corrosion, and/or using with high magnetic fields), beryllium-copper alloys (e.g., small structures, structures with micro-features), stainless steel (e.g., for weldability and/or corrosion resistance), tool steel (e.g., as a body material due to its high strength, hardness, and low cost), tungsten (e.g., for structures with a high compliance coefficient or for body material to minimize bending). The selection of the materials may also ensure coupling (e.g., heat shrinking) between the shank and, for example, receiver.

Referring generally to FIGS. 8A-8B and 9A-9B, and particularly to, e.g., FIGS. 9A-9B, at least another one of first structures 120a is made of a third material. At least another one of second structures 120b is made of a fourth material. The first material is different from the third material. The second material is different from the fourth material. The preceding subject matter of this paragraph characterizes example 7 of the present disclosure, wherein example 7 includes the subject matter of example 6, above.

Different materials may be used for first structures 120a and for second structures 120b to achieve the difference in the axial compliance coefficients along longitudinal central axis 112 and specific distribution of these axial compliance coefficients along longitudinal central axis 112. Furthermore, different materials may be used to achieve different static friction levels between structures and another component, engaging shank 110.

For purposes of these disclosure, the materials of different structures are different when at least one of the material composition, morphology (e.g., crystallinity), or any other material characteristic of these structure differ (e.g., by at least 1%). For example, one structure in a set may receive a different heat treatment (e.g., annealing) or chemical treatment (e.g., coating with another material, carbonization, and the like) than another structure in the same set. Alternatively, different structures of the same set may be formed from different materials, such tool steel and tungsten, or titanium and beryllium-copper alloy, or tool steel and stainless steel, and then indirectly bonded together to a set. In some examples, the third material may be the same as the fourth material. Alternatively, the third material may different from the fourth material.

Referring generally to FIGS. 8A-8B and 9A-9B, and particularly to, e.g., FIGS. 9A-9B, at least one of first structures 120*a* is made of a first material. At least one of second structures 120*b* is made of a second material. The first material is different from the second material. The preceding subject matter of this paragraph characterizes example 8 of the present disclosure, wherein example 8 includes the subject matter of any one of examples 1-5, above.

Materials of first structures 120*a* and second structures 120*b* have an effect on mechanical properties of these structures and sets and in, particular, on their axial compliance coefficients. For example, when the structures of two sets are made from different materials, this difference may be used to achieve different axial compliance coefficients of these sets.

For example, the first material used for of first structures 120*a* may have a lower elastic modulus than the second material used for of second structures 120*b*. In some examples, the elastic modulus of the first material may be at least 5% less than that of the second material or even at least 10% less. This difference in the elastic modulus may result in different axial compliance coefficients of the sets, i.e., the first axial compliance coefficient of first set 117 of first structures 120*a* being greater than the second axial compliance coefficient of second set 119 of second structures 120*b*. For example, the first material may be tool steel, while the second material may be tungsten. In another example, the first material may titanium, while the second material may be a beryllium-copper alloy. In yet another example, the first material may tool steel, while the second material may be stainless steel.

Referring generally to FIGS. 8A-8B and 9A-9B, and particularly to, e.g., FIGS. 9A-9B, at least another one of first structures 120*a* is made of a third material. At least another one of second structures 120*b* is made of a fourth material. The first material is identical to the third material. The second material is identical to the fourth material. The preceding subject matter of this paragraph characterizes example 9 of the present disclosure, wherein example 9 includes the subject matter of example 8, above.

Forming multiple structure of the same set or even an entire set of the same material may be more efficient from the shank fabrication standpoint. Furthermore, the set may be monolithic. Yet, using different materials for different sets may be help to achieve different axial compliance coefficients of different set. For example, the first material (and the third material) use for first structures 120*a* may have a lower elastic modulus than the second material (and the fourth material) used for second structures 120*b*. For example, the first material may be tool steel, while the second material may be tungsten. In another example, the first material may titanium, while the second material may be a beryllium-copper alloy. In yet another example, the first material may tool steel, while the second material may be stainless steel. In some examples, all first structures 120*a* is made from the same materials. Alternatively, at least one of first structures 120*a* is made from a material different from the first material (and the third material). In some examples, all second structures 120*b* is made from the same materials. Alternatively, at least one of second structures 120*b* is made from a material different from the first material (and the third material).

Referring generally to FIGS. 7A, 8A-8B, and 9A-9B, and particularly to, e.g., FIG. 7A, first structures 120*a* have a first combined average width measured along longitudinal central axis 112 of shank 110. Second structures 120*b* have a second combined average width measured along longitudinal central axis 112 of shank 110. The first combined average width is identical to the second combined average width. The preceding subject matter of this paragraph characterizes example 10 of the present disclosure, wherein example 10 includes the subject matter of any one of examples 1-9, above. A width of a structure is one of several factors determining the axial compliance coefficient of this structure. With all other factors being the same, a wider structure may have a smaller axial compliance coefficient than a similar but narrower structure. For a set including one or more structure, a combined average width of all structures in the set may be used as one of many indicators of the axial compliance coefficient of this set. However, this is not the only indicators. As such, even with first structures 120*a* and second structures 120*b* having the same combined average width, the first axial compliance coefficient of first set 117 may be greater than the second axial compliance coefficient of second set 119 of second structures 120*b*.

For purposes of this disclosure, an individual average width of a single structure is defined as a ratio of the cross-sectional area (or half of the cross-sectional area for annular structures) to the length of this structure. The length is defined as its dimension in a direction perpendicular to longitudinal central axis 112. This definition accounts for non-rectangular shapes of structures, such as structures having taper, shaped structure, and the like. Unless specifically, noted a width of structure is referred to as an average width of this structure. The combined average width of a set is defined as a sum of individual average widths of all structures in this set. These individual average widths within the same set may all the same or different (e.g., increase from one end of the set to the other end).

When first structures 120*a* and second structures 120*b* have identical combined average widths, first structures 120*a* and second structures 120*b* may have identical individual widths. Furthermore, identical combined average widths in two different sets may be achieved using structures having different individual widths. In one example, all first structures 120*a* may have identical individual widths. In the same example, all second structures 120*b* may have identical individual widths, which may be the same as the individual widths of first structures 120*a*. In this case, the number of first structures 120*a* and second structures 120*b* may be the same (in order for the combined average widths to be the same for both sets). Furthermore, in this case, the difference between axial compliance coefficients of the two sets may be attributed to different factors. Alternatively, all second structures 120*b* may have identical individual widths, but these individual widths may be different from individual widths of first structures 120*a*. In this case, the number of first structures 120*a* is different from the number of second structures 120*b* (in order for the combined average widths to be the same for both sets). This difference in individual widths and/or number of structures between first set 117 and second set 119 may result in axial compliance coefficients of these two sets being different.

Furthermore, the individual widths of structures within each set may differ. For example, at least one of first structures 120*a* may have a different individual width than at least another one of first structures 120*a*. In this example, all second structures 120*b* may have identical individual widths. Alternatively, at least one of second structures 120*b* may have a different individual width than at least another one of second structures 120*b*. In another example, at least one of second structures 120*b* may have a different individual width than at least another one of second structures 120*b*. In this example, all first structures 120*a* may have the same individual width. Alternatively, at least one of first structures 120*a* may have a different individual width than at least another one of first structures 120*a*.

Referring generally to FIGS. 7A, 8A-8B, and 9A-9B, and particularly to, e.g., FIG. 7A, first structures 120*a* have a first combined average width, measured along longitudinal central axis 112 of shank 110. Second structures 120*b* have a second combined average width, measured along longitudinal central axis 112 of shank 110. The first combined average width is different from the second combined average width. The preceding subject matter of this paragraph characterizes example 11 of the present disclosure, wherein example 11 includes the subject matter of any one of examples 1-9, above. Different combined average widths of first structures 120*a* in first set 117 and second structures 120*b* in second set 119 may yield different axial compliance coefficients in these sets. FIG. 7A illustrates shank 110 that includes first structure 120*a* and second structure 120*b*. Individual width $W_1$ of first structure 120*a* is smaller than individual width $W_2$ of second structure 120*b*. As a result, first structure 120*a* may have a larger axial compliance coefficient than second structure 120*b*. Scaling up this example to sets, the first combined average width of first structures 120*a* is different from the second combined average width of second structures 120*b*, resulting in the first axial compliance coefficient of first set 117 of first structures 120*a* being different from the second axial compliance coefficient of second set 119 of structures 120*b*.

While the first combined average width is different from the second combined average width, individual widths of all structures in each set may be the same or different. For example, the individual widths of all first structures 120*a* may be the same. In this example, the individual widths of all second structures 120*b* may be the same, but different from the individual widths of first structures 120*a*. For example, the individual widths of all second structures 120*b* may greater than the individual widths of first structures 120*a*. Alternatively, the individual widths of all second structures 120*b* may be the same and also the same as the individual widths of first structures 120*a*. However, the number of first structures 120*a* may be different from the number of second structures 120*b*. For example, the number of second structures 120*b* may greater than the number of first structures 120*a*. In alternative examples, the individual widths of second structures 120*b* may different. Furthermore, the individual widths of all second structures 120*b* may the same, but the individual widths of first structures 120*a* may different. For example, at least one of first structures 120*a* may have a different individual width than at least another one of first structures 120*a*.

Referring generally to FIGS. 7A, 8A-8B, and 9A-9B, and particularly to, e.g., FIG. 7A, the first combined average width is less than the second combined average width. The preceding subject matter of this paragraph characterizes example 12 of the present disclosure, wherein example 12 includes the subject matter of example 11, above. As noted above, different widths of the structures in first set 117 and second set 119 may yield different axial compliance coefficients in these sets. Since a greater combined average width may result in a lower axial compliance coefficient, the first combined average width may be less than the second combined average width in order for the first axial compliance coefficient of first set 117 to be greater than the second axial compliance coefficient of second set 119.

In some examples, the first combined average width is less than the second combined average width by at least about 5% or even at least about 50% or even 100%. The first combined average width may be less than the second combined average width due one or more factors, such as different average individual widths of first structures 120*a* and second structures 120*b*, different number of first structures 120*a* and second structures 120*b*, or a combination of both. Furthermore, as described above, individual widths of all structures in each set may be the same or different.

Referring generally to FIGS. 8A-8B, and 9A-9B, and particularly to, e.g., FIG. 7C, first structures 120*a* have a first combined length measured perpendicular to longitudinal central axis 112 of shank 110. Second structures 120*b* have a second combined length measured perpendicular to longitudinal central axis 112 of shank 110. The first combined length is identical to the second combined length. The preceding subject matter of this paragraph characterizes example 13 of the present disclosure, wherein example 13 includes the subject matter of any one of examples 1-11, above.

A length of a structure is one of factors determining the axial compliance coefficient of this structure. With all other factors being the same, a longer structure may have a larger axial compliance coefficient than a similar, but shorter structure. For a set including one or more structures, a combined length of all structures in the set is one of several factors affecting the axial compliance coefficient of the set. As noted above, the combined average width of the structures in each set may be another factor affecting the axial compliance coefficient. Accordingly, even with first structures 120*a* and second structures 120*b* having identical combined lengths, the first axial compliance coefficient of first set 117 may be greater than the second axial compliance coefficient of second set 119 of second structures 120*b*. For example, first structures 120*a* have a smaller combined average width than second structures 120*b* as, for example, shown in FIG. 7C.

For purposes of this disclosure, an individual length of a structure is defined as its dimension in a direction perpendicular to longitudinal central axis 112 measured from the base of the structure to the tip the structure. FIG. 7A identifies length (L) of one structure. The base of the structure may be its connector. The tip of the structure may be a part of the surface engaging another component, e.g., a shank, during operation of shank 110. The combined length of a set is defined as a sum of individual lengths of all structures in this set. All structures within the same set have identical individual lengths. Furthermore, first structures 120*a* and second structures 120*b* have identical individual lengths. In other words, all structures of shank 110 have identical individual lengths. When the number of first structures 120*a* is identical to the number of second structures 120*b*, the first combined length is identical to the second combined length. In this case, the difference between axial compliance coefficients of the two sets may be attributed to other factors (e.g., different combined average widths of first set 117 and second set 119).

Referring generally to FIGS. 8A-8B, and 9A-9B, and particularly to, e.g., FIGS. 7D and 7E, first structures 120*a* have a first combined length measured perpendicular to longitudinal central axis 112 of shank 110. Second structures 120*b* have a second combined length measured perpendicular to longitudinal central axis 112 of shank 110. The first combined length is different from the second combined length. The preceding subject matter of this paragraph characterizes example 14 of the present disclosure, wherein example 14 includes the subject matter of any one of examples 1-11, above. Different combined lengths of first structures 120*a* in first set 117 and of second structures 120*b* in second set 119 may yield different axial compliance coefficients for these sets of structures.

While the first combined length of first structures 120a may be different from the second combined length of second structures 120b, individual lengths of all structures in both sets are identical. Accordingly, the number of first structures 120a may be different from the number of second structures 120b. For example, the number of second structures 120b may be fewer than the number of first structures 120a, as illustrated in FIG. 7E. In this example, individual widths of second structures 120b are greater than individual widths of first structures 120a. It should be noted that in this example the first combined average width may be the same as the second combined average width. For example, individual widths of second structures 120b may be twice greater than individual widths of first structures 120a while there may be twice fewer second structures 120b than first structures 120a. Alternatively, the number of second structures 120b may be greater than the number of first structures 120a, as illustrated in FIG. 7D. Individual widths of second structures 120b may be the same as individual widths of first structures 120a as shown in FIG. 7D or different. It should be noted that in both examples shown in FIGS. 7D and 7E, the first axial compliance coefficient of first set 117 of first structures 120a is greater than the second axial compliance coefficient of second set 119 of the second structures 120b.

Referring generally to FIGS. 8A-8B, and 9A-9B, and particularly to, e.g., FIG. 7E, the first combined length is greater than the second combined length. The preceding subject matter of this paragraph characterizes example 15 of the present disclosure, wherein example 15 includes the subject matter of example 14, above.

As noted above, different combined lengths of first structures 120a and second structures 120b may yield different axial compliance coefficients for their corresponding sets. Specifically, if the first combined length of first structures 120a is greater than the second combined length of second structures 120b, the first axial compliance coefficient of first set 117 may be greater than the second axial compliance coefficient of second set 119 as, for example, shown in FIG. 7E.

In some examples, the first combined length is greater than the second combined length by at least about 5%. In other examples, the first combined length is greater than the second combined length by at least about 50%. In still other examples, the first combined length is greater than the second combined length by at least about 100%. When the first combined length is greater than the second combined length, this is due to a larger number of first structures 120a than of second structures 120b.

Referring generally to FIGS. 7B, 8A-8B, and 9A-9B, and particularly to, e.g., FIG. 7B, first structures 120a have a first combined camber angle. Second structures 120b have a second combined camber angle. The first combined camber angle is identical to the second combined camber angle. The preceding subject matter of this paragraph characterizes example 16 of the present disclosure, wherein example 16 includes the subject matter of any one of examples 1-11, 13, or 14, above.

A camber angle of a structure is one of factors determining the axial compliance coefficient of this structure. With all other factors being the same, a structure with a smaller camber angle may have a larger axial compliance coefficient than a similar structure with a larger camber angle. For a set including one or more structures, a combined camber angle of all structures in the set may be used as one of many indicators of the axial compliance coefficient of that set. As noted above, the widths and lengths of structures in each set may other indicators of the axial compliance coefficient of that set. As such, even with first structures 120a and second structures 120b having identical combined camber angles, the first axial compliance coefficient of first set 117 may be greater than the second axial compliance coefficient of second set 119 of second structures 120b.

For purposes of this disclosure, an individual camber angle of a structure (one of first structures 120a or second structures 120b) is defined as an angle between one side of a cross-section of that structure and an axis extending perpendicular to longitudinal central axis 112 in the plane of the cross-section. When both sides of the cross-section of the structure are symmetrical with respect to that axis, either one of the sides may be used for determining the individual camber angle of this structure. However, when the two sides are not symmetrical, an average value of camber angles of both sides is used as an individual camber angle for the corresponding structure. The individual camber angle may be positive or negative, depending on the position of the side relative to the axis extending perpendicular to longitudinal central axis 112. Another way of determining whether the individual camber angle is positive or negative is based on the angle between the side and longitudinal central axis 112. Specifically, if the side and longitudinal central axis 112 form an obtuse angle, then the individual camber angle is positive. However, if the side and longitudinal central axis 112 form an acute angle, then the individual camber angle is negative. Finally, if the side and longitudinal central axis 112 are perpendicular, then the individual camber angle is zero. A combined camber angle of a set is defined as a sum of all individual camber angles for all structures in that set. FIG. 7B illustrates shank 110 that has first structure 120a and second structure 120b. Camber angle $\alpha$ of first structure 120a is positive and is greater than the camber angle $-\alpha$ (which is a negative camber angle) of second structure 120b. Scaling up this example to sets, the first combined camber angle of first structures 120a is different from the second combined camber angle of second structures 120b resulting in the first axial compliance coefficient of first set 117 being different from the second axial compliance coefficient of second set 119.

When first structures 120a and second structures 120b have identical combined camber angles, first structures 120a and second structures 120b may have identical individual camber angles. Furthermore, identical combined camber angles may be achieved in both sets with structures having different individual camber angles. In one example, all first structures 120a may have identical individual camber angles. In the same example, all second structures 120b may have identical individual camber angles, which may be also identical to individual camber angles of first structures 120a. In this case, the number of first structures 120a and second structures 120b may be identical. Furthermore, in this case, the difference between axial compliance coefficients of the two sets may be attributed to different factors (e.g., different combined average widths of first set 117 and second set 119). Alternatively, all second structures 120b may have identical individual camber angles, but this camber angle may be different from the individual camber angle of first structures 120a (all first structures 120a may have identical individual camber angles). In this case, the number of first structures 120a is different from the number of second structures 120b. The difference in individual camber angles and numbers of the structures may result in different axial compliance coefficients of the two sets of structures.

Furthermore, individual camber angles of structures within each set may differ. For example, at least one of first structures 120a may have a different individual camber angle than at least another one of first structures 120a. In this example, all second structures 120b may have identical individual camber angles. Alternatively, at least one of second structures 120b may have a different individual camber angle than at least another one of second structures 120b. In another example, at least one of second structures 120b may have a different individual camber angle than at least another one of second structures 120b. In this example, all first structures 120a may have identical individual camber angles. Alternatively, at least one of first structures 120a may have a different individual camber angle than at least another one of first structures 120a.

Referring generally to FIGS. 8A-8B, and 9A-9B, and particularly to, e.g., FIG. 7B, first structures 120a have a first combined camber angle. Second structures 120b have a second combined camber angle. The first combined camber angle is different from the second combined camber angle. The preceding subject matter of this paragraph characterizes example 17 of the present disclosure, wherein example 17 includes the subject matter of any one of examples 1-11, 13, or 14, above. Different combined camber angles of first set 117 and second set 119 may yield different axial compliance coefficients in these sets.

While the first combined camber angle is different from the second combined camber angle, individual camber angles of all structures in each set may be identical or different. For example, individual camber angles of all first structures 120a may be identical. In this example, the individual camber angles of all second structures 120b may be identical to each other, but different from the individual camber angles of first structures 120a. For example, the individual camber angles of all second structures 120b may be less than the individual camber angles of first structures 120a. Alternatively, the individual camber angles of all second structures 120b may be identical to each other and also identical to the individual camber angles of first structures 120a. However, the number of first structures 120a may be different from the number of second structures 120b. For example, the number of second structures 120b may greater than the number of first structures 120a. In alternative examples, the individual camber angles of second structures 120b may different. Furthermore, the individual camber angles of all second structures 120b may identical, but the individual camber angles of first structures 120a may different. For example, at least one of first structures 120a may have a different individual camber angle that at least another one of first structure 120a.

Referring generally to FIGS. 8A-8B, and 9A-9B, and particularly to, e.g., FIG. 7B, the first combined camber angle is less than the second combined camber angle. The preceding subject matter of this paragraph characterizes example 18 of the present disclosure, wherein example 18 includes the subject matter of example 17, above. As noted above, different combined camber angles of first set 117 and second set 119 may yield different axial compliance coefficients in these sets. Since a greater combined camber angle may result in a higher axial compliance coefficient, the first combined camber angle may be greater than the second combined camber angle in order for the first axial compliance coefficient of first set 117 to be greater than the second axial compliance coefficient of second set 119.

In some examples, the first combined camber angle is greater than the second combined camber angle by at least about 5% or even at least about 25% or even 50%. The first combined camber angle may be greater than the second combined camber angle due one or more factors, such as different individual camber angles of first structures 120a and second structures 120b, different number of first structures 120a and second structures 120b, or a combination of both. Furthermore, as described above, camber angles of all structures in each set may be the same or different.

Referring generally to FIGS. 8A-8B, shank 110 further comprising cutting edge 121. First structures 120a are closer to cutting edge 121 than second structures 120b. The preceding subject matter of this paragraph characterizes example 19 of the present disclosure, wherein example 19 includes the subject matter of any one of examples 1-18, above. Cutting edge 121 may be a drill bit, a countersink, a counter-bore, a tap, a die, a milling cutter, a reamer, or a cold saw blade. Additional examples of cutting edge 121 include, but are not limited to a end mill, a roughing end mill, a ball nose cutter, a slab mill, a side-and-face cutter, a involute gear cutter, a hob, a thread mill, a face mill, a fly cutter, a woodruff cutter, a hollow mill, a dovetail cutter, or a shell mill. When such examples of cutting edge 121 are used, an axial load may be applied to the structures as described above.

Referring, e.g., to FIGS. 1, 8A, 8B, 9A, and 9B, shank 110 is disclosed. Shank 110 comprises captive portion 116, comprising a longitudinal central axis 112. Shank 110 also comprises captive end 118, first set 117 of first structures 120a, and second set 119 of second structures 120b. First structures 120a extend away from longitudinal central axis 112 in a direction normal to longitudinal central axis 112. Second structures 120b extend away from longitudinal central axis 112 in a direction normal to longitudinal central axis 112. First set 117 of first structures 120a and second set 119 of second structures 120b are indirectly connected together. The preceding subject matter of this paragraph characterizes example 20 of the present disclosure.

Indirectly connecting first set 117 of first structures 120a and second set 119 of second structures 120b supports these sets with respect to each other, thereby maintaining mechanical and functional integrity of shank 110. Furthermore, this indirect connection allows transferring loads (e.g., forces and torques) between first set 117 of first structures 120a and second set 119 of second structures 120b.

Those skilled in the art will appreciate that first set 117 of first structures 120a and second set 119 of second structures 120b will be considered indirectly connected together when first set 117 of first structures 120a and second set 119 of second structures 120b are, e.g., monolithically formed of the same starting block of material, as long as all individual structures are discrete, i.e., have the same length. This type of shank 110 does not need a separate bonding operation during its fabrication and may be stronger than shank 110 formed using various bonding techniques. Alternatively, one of first structures 120a, which is immediately adjacent to second set 119 of second structures 120b, may be monolithic with one of second structures 120b, which is immediately adjacent to first set 117 of first structures 120a. For example, the end structure of first set 117 of first structures 120a and the adjacent end structure of second set 119 of second structures 120b may be made of the same starting block of material. One or more other structures of first set 117 of first structures 120a and/or of second set 119 of second structures 120b may be indirectly bonded to this monolithic center portion using one or more bonding techniques. Furthermore, one of first structures 120a, which is immediately adjacent to second set 119 of second structures 120b, and one of second structures 120b, which is immediately adjacent to first set 117 of first structures 120*a*, may be indirectly connected to each other using one or more bonding techniques. These structures may be supported by connectors, monolithic with or bonded to their respective structures, and these connectors may be directly connected to each other, e.g., through bonding or being monolithically formed, such that the structures are indirectly interconnected, meaning that all the structures are discrete, i.e., have the same length. Some examples of applicable bonding techniques include welding (using, e.g., a gas flame, an electric arc, a laser, an electron beam, friction, and ultrasound), diffusion bonding, adhesive bonding, mechanical coupling, and the like.

Referring generally to FIGS. 1, 8A, 8B, 9A, and 9B, and particularly to, e.g., FIG. 8B, first structures 120*a* are indirectly connected together. Second structures 120*b* are indirectly connected together. The preceding subject matter of this paragraph characterizes example 21 of the present disclosure, wherein example 21 includes the subject matter of example 20, above.

Structures may be indirectly connected together within each set (e.g., first structures 120*a* are indirectly connected together via first connectors 125*a*, and, similarly, second structures 120*b* are indirectly connected together via second connectors 125*b*) to ensure mechanical and functional integrity of each set of structures. As stated above, those skilled in the art will appreciate that structures are considered to be indirectly connected together if all of the structures are discrete, i.e., have the same length, once interconnected. Furthermore, this indirect connection may allow transferring various loads between the structures within the set (e.g., through their connectors that may be directly connected as, for example, described above with reference to FIGS. 9A and 9B).

Indirect connection among first structures 120*a* and/or among second structures 120*b* may be the result of the structures in one or both sets of structures being monolithic. In some examples, structures within one set may be separate components that are indirectly bonded together (e.g., via their connectors) using one or more bonding techniques. Some examples of such techniques include welding (using, e.g., a gas flame, an electric arc, a laser, an electron beam, friction, and ultrasound), diffusion bonding, adhesive bonding, mechanical coupling, and the like. Having separate structures that are later indirectly bonded into a set allows, in some examples, using structures with different material compositions, shapes, and/or other features that may be more difficult or impossible to achieve with monolithic sets of structures.

Referring generally to FIGS. 1, 8A, 8B, 9A, and 9B, and particularly to, e.g., FIG. 8B, first set 117 of first structures 120*a* and second set 119 of second structures 120*b* are diffusion bonded together indirectly. The preceding subject matter of this paragraph characterizes example 22 of the present disclosure, wherein example 22 includes the subject matter of any one of examples 20 or 21, above.

Diffusion bonding introduces minimal residual stress, plastic deformation, and may be suitable for materials that cannot be bonded by other techniques (e.g., by liquid fusion). As such, diffusion bonding may preserve the geometry and orientations of first structures 120*a* in first set 117 and second structures 120*b* in second set 119 when first structures 120*a* in first set 117 and second structures 120*b* in second set 119 are diffusion bonded together indirectly. Furthermore, diffusion bonding allows using different materials for first structures 120*a* in first set 117 in comparison to materials of second structures 120*b* in second set 119 when, for example, first structures 120*a* are monolithic with their connectors and second structures 120*b* are monolithic with their connectors.

Diffusion bonding is a solid-state welding technique capable of joining similar and dissimilar metals based on solid-state diffusion. Diffusion bonding may involve compressing surfaces of two components at high temperatures resulting in atoms of a first component to diffuse into the second component (e.g., driven by the concentration gradient) and atoms of the second component to diffuse into the first component.

When first set 117 of first structures 120*a* and second set 119 of second structures 120*b* are diffusion bonded together indirectly, adjacent end structures of first set 117 of first structures 120*a* and of second set 119 of second structures 120*b* may be diffusion bonded together to each other indirectly. More specifically, these structures may be supported by connectors, and these two connectors may be diffusion bonded to each other directly.

FIGS. 9A and 9B schematically illustrates an example of indirect connections of first set 117 of first structures 120*a* and second set 119 of second structures 120*b*. One of first structures 120*a* may be an end structure of first set 117 of first structures 120*a* and may be adjacent to second set 119 of second structures 120*b*. Each first structure 120*a* may be supported by one of first connectors 125*a* and may extend from first connector 125*a* toward longitudinal central axis 112, as shown in FIGS. 9A and 9B. First structure 120*a* and first connector 125*a* may both have annular shapes. One of second structures 120*b* may be an end structure of second set 119 of second structures 120*b* and may be adjacent to first set 117 of first structures 120*a*. Each second structure 120*b* may be supported by one of second connectors 125*b* and may extend from second connector 125*b* toward longitudinal central axis 112. Second structure 120*b* and second connector 125*b* may both have annular shapes.

One of first structures 120*a* (an end structure of first set 117 of first structures 120*a*) may be indirectly connected to one of second structures 120*b* (an end structure of second set 119 of second structures 120*b*) via first connector 125*a* and second connector 125*b*. For example, first connector 125*a* and second connector 125*b* may be directly bonded to each other using one of suitable bonding techniques. First structure 120*a* and first connector 125*a* may be monolithic or directly bonded to each other. Second structure 120*b* and second connector 125*b* may be monolithic or directly bonded to each other. In some examples, first connector 125*a* may be monolithic with second connector 125*b*, while first structure 120*a* and second structure 120*b* may be directly bonded to first connector 125*a* and second connector 125*b*, respectively, using one or more bonding techniques. It should be noted that while first connector 125*a* and second connector 125*b* may directly contact each other, first structure 120*a* and second structure 120*b* are spaced apart from each other even though first structure 120*a* may be indirectly connected to second structure 120*b*.

Referring generally to FIGS. 1, 8A, 8B, 9A, and 9B, and particularly to, e.g., FIG. 8B, first structures 120*a* are diffusion bonded together indirectly and second structures 120*b* are diffusion bonded together indirectly. The preceding subject matter of this paragraph characterizes example 23 of the present disclosure, wherein example 23 includes the subject matter of example 22, above.

Diffusion bonding introduces minimal residual stress, plastic deformation, and may be suitable for materials that cannot be bonded by other techniques (e.g., liquid fusion). As such, diffusion bonding may preserve the geometry and orientations of first structures 120a in first set 117 and second structures 120b in second set 119 when first structures 120a are diffusion bonded together indirectly (e.g., through supported of first structures 120a being diffusion bonded directly) and/or when second structures 120b are diffusion bonded together indirectly (e.g., through supported of first structures 120a being diffusion bonded directly). Furthermore, diffusion bonding allows using different materials for first structures 120a in first set 117 in comparison to materials of second structures 120b in second set 119 when, for example, first structures 120a are monolithic with their connectors and second structures 120b are monolithic with their connectors.

Diffusion bonding is a solid-state welding technique capable of joining similar and dissimilar metals based on solid-state diffusion. Diffusion bonding may involve compressing surfaces of two components at high temperatures resulting in atoms of a first component to diffuse into the second component (e.g., driven by the concentration gradient) and atoms of the second component to diffuse into the first component.

When first structures 120a are diffusion bonded together indirectly and second structures 120b are diffusion bonded together indirectly, supports of first structures 120a may be diffusion bonded together directly and/or supports of second structures 120b may be diffusion bonded together directly. In some examples, first structures 120a may be diffusion bonded to their supports, which may be monolithic or bonded together using one or more bonding techniques, such as diffusion bonding. In some examples, second structures 120b may be diffusion bonded to their supports, which may be monolithic or bonded together using one or more bonding techniques, such as diffusion bonding. In some examples, supports of first structures 120a and supports of second structures 120b are monolithic.

Referring generally to FIGS. 8A-8B and 9A-9B, and particularly to, e.g., FIGS. 9A-9B, at least one of first structures 120a is made of a first material. At least one of second structures 120b is made of a second material. The first material is identical to the second material. The preceding subject matter of this paragraph characterizes example 24 of the present disclosure, wherein example 24 includes the subject matter of any one of examples 20-23, above.

Materials of first structures 120a and second structures 120b effect mechanical properties of these structures and sets and, in particular, their axial compliance coefficients. For example, when all structures of both sets are made from the identical material, the difference in the axial compliance coefficients between these two sets may be achieved by different geometries of the structures or some other characteristics. Furthermore, when all structures of both sets are made from the identical material, the entire shank may be monolithic or may be bonded more easily than, for example, when materials of the two sets are different. Alternatively, even though at one of first structures 120a is made from the identical material as at least one of second structures 120b, other structures in these sets may be made from other materials, which may be used to tailor axial compliance coefficients of the sets and individual structures within the sets.

For purposes of these disclosure, the materials of different structures are identical when material composition, morphology (e.g., crystallinity), and other material characteristics of these structure are identical (or vary by less than 1%, for example). It should be noted that the structures (made from the identical materials) may still have different size, shape, and other geometric characteristics. In some examples, all first structures 120a are made of the first material. Furthermore, all second structures 120b are made of the second material. In other words, all structures of shank 110 are made from the identical material. Some examples of the first material and second material include titanium (e.g., for weight reduction, allowing for rapid changes in the rotational speed of the shank, preventing corrosion, and/or using with high magnetic fields), beryllium-copper alloys (e.g., small structures, structures with micro-features), stainless steel (e.g., for weldability and/or corrosion resistance), tool steel (e.g., as a body material due to its high strength, hardness, and low cost), tungsten (e.g., for structures with a high compliance coefficient or for body material to minimize bending). The selection of the materials may also ensure coupling (e.g., heat shrinking) between the shank and, for example, receiver.

Referring generally to FIGS. 8A-8B and 9A-9B, and particularly to, e.g., FIGS. 9A-9B, at least another of first structures 120a is made of a third material. At least another of second structures 120b is made of a fourth material. The first material is different from the third material. The second material is different from the fourth material. The preceding subject matter of this paragraph characterizes example 25 of the present disclosure, wherein example 25 includes the subject matter of example 24, above.

Different materials may be used for first structures 120a and for second structures 120b to achieve the difference in the axial compliance coefficients along longitudinal central axis 112 and specific distribution of these axial compliance coefficients along longitudinal central axis 112. Furthermore, different materials may be used to achieve different static friction levels between structures and another component, engaging shank 110.

For purposes of these disclosure, the materials of different structures are different when at least one of the material composition, morphology (e.g., crystallinity), or any other material characteristic of these structure differ (e.g., by at least 1%). For example, one structure in a set may receive a different heat treatment (e.g., annealing) or chemical treatment (e.g., coating with another material, carbonization, and the like) than another structure in the same set. Alternatively, different structures of the same set may be formed from different materials, such tool steel and tungsten, or titanium and beryllium-copper alloy, or tool steel and stainless steel, and then indirectly bonded together to a set. In some examples, the third material may be the same as the fourth material. Alternatively, the third material may different from the fourth material.

Referring generally to FIGS. 8A-8B and 9A-9B, and particularly to, e.g., FIGS. 9A-9B, at least one of first structures 120a is made of a first material. At least one of second structures 120b is made of a second material. The first material is different from the second material. The preceding subject matter of this paragraph characterizes example 26 of the present disclosure, wherein example 26 includes the subject matter of any one of examples 20-23, above.

Materials of first structures 120a and second structures 120b have an effect on mechanical properties of these structures and sets and in, particular, on their axial compliance coefficients. For example, when the structures of two sets are made from different materials, this difference may be used to achieve different axial compliance coefficients of these sets.

For example, the first material used for of first structures 120a may have a lower elastic modulus than the second material used for of second structures 120*b*. In some examples, the elastic modulus of the first material may be at least 5% less than that of the second material or even at least 10% less. This difference in the elastic modulus may result in different axial compliance coefficients of the sets, i.e., the first axial compliance coefficient of first set 117 of first structures 120*a* being greater than the second axial compliance coefficient of second set 119 of second structures 120*b*. For example, the first material may be tool steel, while the second material may be tungsten. In another example, the first material may titanium, while the second material may be a beryllium-copper alloy. In yet another example, the first material may tool steel, while the second material may be stainless steel.

Referring generally to FIGS. 8A-8B and 9A-9B, and particularly to, e.g., FIGS. 9A-9B, at least another of first structures 120*a* is made of a third material. At least another of second structures 120*b* is made of a fourth material. The first material is identical to the third material. The second material is identical to the fourth material. The preceding subject matter of this paragraph characterizes example 27 of the present disclosure, wherein example 27 includes the subject matter of example 26, above.

Forming multiple structure of the same set or even an entire set of the same material may be more efficient from the shank fabrication standpoint. Furthermore, the set may be monolithic. Yet, using different materials for different sets may be help to achive different axial compliance coefficients of different set. For example, the first material (and the third material) use for first structures 120*a* may have a lower elastic modulus than the second material (and the fourth material) used for second structures 120*b*. For example, the first material may be tool steel, while the second material may be tungsten. In another example, the first material may titanium, while the second material may be a beryllium-copper alloy. In yet another example, the first material may tool steel, while the second material may be stainless steel. In some examples, all first structures 120*a* is made from the same materials. Alternatively, at least one of first structures 120*a* is made from a material different from the first material (and the third material). In some examples, all second structures 120*b* is made from the same materials. Alternatively, at least one of second structures 120*b* is made from a material different from the first material (and the third material).

Referring generally to FIGS. 7A, 8A-8B, and 9A-9B, and particularly to, e.g., FIG. 7A, first structures 120*a* have a first combined average width measured along longitudinal central axis 112 of shank 110. Second structures 120*b* have a second combined average width measured along longitudinal central axis 112 of shank 110. The first combined average width is identical to the second combined average width. The preceding subject matter of this paragraph characterizes example 28 of the present disclosure, wherein example 28 includes the subject matter of any one of examples 20-27, above.

A width of a structure is one of several factors determining the axial compliance coefficient of this structure. With all other factors being the same, a wider structure may have a smaller axial compliance coefficient than a similar but narrower structure. For a set including one or more structure, a combined average width of all structures in the set may be used as one of many indicators of the axial compliance coefficient of this set. However, this is not the only indicators. As such, even with first structures 120*a* and second structures 120*b* having the same combined average width, the first axial compliance coefficient of first set 117 may be greater than the second axial compliance coefficient of second set 119 of second structures 120*b*.

For purposes of this disclosure, an individual average width of a single structure is defined as a ratio of the cross-sectional area (or half of the cross-sectional area for annular structures) to the length of this structure. The length is defined as its dimension in a direction perpendicular to longitudinal central axis 112. This definition accounts for non-rectangular shapes of structures, such as structures having taper, shaped structure, and the like. Unless specifically, noted a width of structure is referred to as an average width of this structure. The combined average width of a set is defined as a sum of individual average widths of all structures in this set. These individual average widths within the same set may all the same or different (e.g., increase from one end of the set to the other end).

When first structures 120*a* and second structures 120*b* have identical combined average widths, first structures 120*a* and second structures 120*b* may have identical individual widths. Furthermore, identical combined average widths in two different sets may be achieved using structures having different individual widths. In one example, all first structures 120*a* may have identical individual widths. In the same example, all second structures 120*b* may have identical individual widths, which may be the same as the individual widths of first structures 120*a*. In this case, the number of first structures 120*a* and second structures 120*b* may be the same (in order for the combined average widths to be the same for both sets). Furthermore, in this case, the difference between axial compliance coefficients of the two sets may be attributed to different factors. Alternatively, all second structures 120*b* may have identical individual widths, but these individual widths may be different from individual widths of first structures 120*a*. In this case, the number of first structures 120*a* is different from the number of second structures 120*b* (in order for the combined average widths to be the same for both sets). This difference in individual widths and/or number of structures between first set 117 and second set 119 may result in axial compliance coefficients of these two sets being different.

Furthermore, the individual widths of structures within each set may differ. For example, at least one of first structures 120*a* may have a different individual width than at least another one of first structures 120*a*. In this example, all second structures 120*b* may have identical individual widths. Alternatively, at least one of second structures 120*b* may have a different individual width than at least another one of second structures 120*b*. In another example, at least one of second structures 120*b* may have a different individual width than at least another one of second structures 120*b*. In this example, all first structures 120*a* may have the same individual width. Alternatively, at least one of first structures 120*a* may have a different individual width than at least another one of first structures 120*a*.

Referring generally to FIGS. 7A, 8A-8B, and 9A-9B, and particularly to, e.g., FIG. 7A, first structures 120*a* have a first combined average width, measured along longitudinal central axis 112 of shank 110. Second structures 120*b* have a second combined average width, measured along longitudinal central axis 112 of shank 110. The first combined average width is different from the second combined average width. The preceding subject matter of this paragraph characterizes example 29 of the present disclosure, wherein example 29 includes the subject matter of any one of examples 20-27, above. Different combined average widths of first structures 120*a* in first set 117 and second structures 120*b* in second set 119 may yield different axial compliance coefficients in these sets. FIG. 7A illustrates shank 110 that has first structure 120a and second structure 120b. Individual width $W_1$ of first structure 120a is smaller than individual width $W_2$ of second structure 120b. As a result, first structure 120a may have a larger axial compliance coefficient than second structure 120b. Scaling up this example to sets, the first combined average width of first structures 120a is different from the second combined average width of second structures 120b, resulting in the first axial compliance coefficient of first set 117 being different from the second axial compliance coefficient of second set 119.

While the first combined average width is different from the second combined average width, individual widths of all structures in each set may be the same or different. For example, the individual widths of all first structures 120a may be the same. In this example, the individual widths of all second structures 120b may be the same but different from the individual widths of first structures 120a. For example, the individual widths of all second structures 120b may greater than the individual widths of first structures 120a. Alternatively, the individual widths of all second structures 120b may be the same, and also the same as the individual widths of first structures 120a. However, the number of first structures 120a may be different from the number of second structures 120b. For example, the number of second structures 120b may greater than the number of first structures 120a. In alternative examples, the individual widths of second structures 120b may different. Furthermore, the individual widths of all second structures 120b may the same, but the individual widths of first structures 120a may different. For example, at least one of first structures 120a may have a different individual width than at least another one of first structures 120a.

Referring generally to FIGS. 7A, 8A-8B, and 9A-9B, and particularly to, e.g., FIG. 7A, the first combined average width is less than the second combined average width. The preceding subject matter of this paragraph characterizes example 30 of the present disclosure, wherein example 30 includes the subject matter of example 29, above. As noted above, different widths of the structures in first set 117 and second set 119 may yield different axial compliance coefficients in these sets. Since a greater combined average width may result in a lower axial compliance coefficient, the first combined average width may be less than the second combined average width in order for the first axial compliance coefficient of first set 117 to be greater than the second axial compliance coefficient of second set 119.

In some examples, the first combined average width is less than the second combined average width by at least about 5% or even at least about 50% or even 100%. The first combined average width may be less than the second combined average width due one or more factors, such as different average individual widths of first structures 120a and second structures 120b, different number of first structures 120a and second structures 120b, or a combination of both. Furthermore, as described above, individual widths of all structures in each set may be the same or different.

Referring generally to FIGS. 8A-8B, and 9A-9B, and particularly to, e.g., FIG. 7C, first structures 120a have a first combined length measured perpendicular to longitudinal central axis 112 of shank 110. Second structures 120b have a second combined length measured perpendicular to longitudinal central axis 112 of shank 110. The first combined length is identical to the second combined length. The preceding subject matter of this paragraph characterizes example 31 of the present disclosure, wherein example 31 includes the subject matter of any one of examples 20-29, above.

A length of a structure is one of factors determining the axial compliance coefficient of this structure. With all other factors being the same, a longer structure may have a larger axial compliance coefficient than a similar, but shorter structure. For a set including one or more structures, a combined length of all structures in the set is one of several factors affecting the axial compliance coefficient of the set. As noted above, the combined average width of the structures in each set may be another factor affecting the axial compliance coefficient. Accordingly, even with first structures 120a and second structures 120b having identical combined lengths, the first axial compliance coefficient of first set 117 may be greater than the second axial compliance coefficient of second set 119 of second structures 120b. For example, first structures 120a have a smaller combined average width than second structures 120b as, for example, shown in FIG. 7C.

For purposes of this disclosure, an individual length of a structure is defined as its dimension in a direction perpendicular to longitudinal central axis 112 measured from the base of the structure to the tip the structure. FIG. 7A identifies length (L) of one structure. The base of the structure may be its connector. The tip of the structure may be a part of the surface engaging another component, e.g., a shank, during operation of shank 110. The combined length of a set is defined as a sum of individual lengths of all structures in this set. All structures within the same set have identical individual lengths. Furthermore, first structures 120a and second structures 120b have identical individual lengths. In other words, all structures of shank 110 have identical individual lengths. When the number of first structures 120a is identical to the number of second structures 120b, the first combined length is identical to the second combined length. In this case, the difference between axial compliance coefficients of the two sets may be attributed to other factors (e.g., different combined average widths of first set 117 and second set 119).

Referring generally to FIGS. 8A-8B, and 9A-9B, and particularly to, e.g., FIGS. 7D and 7E, first structures 120a have a first combined length measured perpendicular to longitudinal central axis 112 of shank 110. Second structures 120b have a second combined length measured perpendicular to longitudinal central axis 112 of shank 110. The first combined length is different from the second combined length. The preceding subject matter of this paragraph characterizes example 32 of the present disclosure, wherein example 32 includes the subject matter of any one of examples 20-29, above. Different combined lengths of first set 117 and second set 119 may yield different axial compliance coefficients in these sets.

While the first combined length of first structures 120a may be different from the second combined length of second structures 120b, individual lengths of all structures in both sets are identical. Accordingly, the number of first structures 120a may be different from the number of second structures 120b. For example, the number of second structures 120b may be fewer than the number of first structures 120a, as illustrated in FIG. 7E. In this example, individual widths of second structures 120b are greater than individual widths of first structures 120a. It should be noted that in this example the first combined average width may be the same as the second combined average width. For example, individual widths of second structures 120b may be twice greater than individual widths of first structures 120a while there may be twice fewer second structures 120*b* than first structures 120*a*. Alternatively, the number of second structures 120*b* may be greater than the number of first structures 120*a*, as illustrated in FIG. 7D. Individual widths of second structures 120*b* may be the same as individual widths of first structures 120*a* as shown in FIG. 7D or different. It should be noted that in both examples shown in FIGS. 7D and 7E, the first axial compliance coefficient of first set 117 of first structures 120*a* is greater than the second axial compliance coefficient of second set 119 of the second structures 120*b*.

Referring generally to FIGS. 8A-8B, and 9A-9B, and particularly to, e.g., FIG. 7E, the first combined length is greater than the second combined length. The preceding subject matter of this paragraph characterizes example 33 of the present disclosure, wherein example 33 includes the subject matter of example 32, above.

As noted above, different combined lengths of first structures 120*a* and second structures 120*b* may yield different axial compliance coefficients for their corresponding sets. Specifically, if the first combined length of first structures 120*a* is greater than the second combined length of second structures 120*b*, the first axial compliance coefficient of first set 117 may be greater than the second axial compliance coefficient of second set 119 as, for example, shown in FIG. 7E.

In some examples, the first combined length is greater than the second combined length by at least about 5%. In other examples, the first combined length is greater than the second combined length by at least about 50%. In still other examples, the first combined length is greater than the second combined length by at least about 100%. When the first combined length is greater than the second combined length, this is due to a larger number of first structures 120*a* than of second structures 120*b*.

Referring generally to FIGS. 8A-8B, and 9A-9B, and particularly to, e.g., FIG. 7B, first structures 120*a* have a first combined camber angle. Second structures 120*b* have a second combined camber angle. The first combined camber angle is identical to the second combined camber angle. The preceding subject matter of this paragraph characterizes example 34 of the present disclosure, wherein example 34 includes the subject matter of any one of examples 20-29, 31, or 32, above.

A camber angle of a structure is one of factors determining the axial compliance coefficient of this structure. With all other factors being the same, a structure with a smaller camber angle may have a larger axial compliance coefficient than a similar structure with a larger camber angle. For a set including one or more structures, a combined camber angle of all structures in the set may be used as one of many indicators of the axial compliance coefficient of that set. As noted above, the widths and lengths of structures in each set may other indicators of the axial compliance coefficient of that set. As such, even with first structures 120*a* and second structures 120*b* having identical combined camber angles, the first axial compliance coefficient of first set 117 may be greater than the second axial compliance coefficient of second set 119 of second structures 120*b*.

For purposes of this disclosure, an individual camber angle of a structure (one of first structures 120*a* or second structures 120*b*) is defined as an angle between one side of a cross-section of that structure and an axis extending perpendicular to longitudinal central axis 112 in the plane of the cross-section. When both sides of the cross-section of the structure are symmetrical with respect to that axis, either one of the sides may be used for determining the individual camber angle of this structure. However, when the two sides are not symmetrical, an average value of camber angles of both sides is used as an individual camber angle for the corresponding structure. The individual camber angle may be positive or negative, depending on the position of the side relative to the axis extending perpendicular to longitudinal central axis 112. Another way of determining whether the individual camber angle is positive or negative is based on the angle between the side and longitudinal central axis 112. Specifically, if the side and longitudinal central axis 112 form an obtuse angle, then the individual camber angle is positive. However, if the side and longitudinal central axis 112 form an acute angle, then the individual camber angle is negative. Finally, if the side and longitudinal central axis 112 are perpendicular, then the individual camber angle is zero. A combined camber angle of a set is defined as a sum of all individual camber angles for all structures in that set. FIG. 7B illustrates shank 110 that has first structure 120*a* and second structure 120*b*. Camber angle $\alpha$ of first structure 120*a* is positive and is greater than the camber angle $-\alpha$ (which is a negative camber angle) of second structure 120*b*. Scaling up this example to sets, the first combined camber angle of first structures 120*a* is different from the second combined camber angle of second structures 120*b* resulting in the first axial compliance coefficient of first set 117 being different from the second axial compliance coefficient of second set 119.

When first structures 120*a* and second structures 120*b* have identical combined camber angles, first structures 120*a* and second structures 120*b* may have identical individual camber angles. Furthermore, identical combined camber angles may be achieved in both sets with structures having different individual camber angles. In one example, all first structures 120*a* may have identical individual camber angles. In the same example, all second structures 120*b* may have identical individual camber angles, which may be also identical to individual camber angles of first structures 120*a*. In this case, the number of first structures 120*a* and second structures 120*b* may be identical. Furthermore, in this case, the difference between axial compliance coefficients of the two sets may be attributed to different factors (e.g., different combined average widths of first set 117 and second set 119). Alternatively, all second structures 120*b* may have identical individual camber angles, but this camber angle may be different from the individual camber angle of first structures 120*a* (all first structures 120*a* may have identical individual camber angles). In this case, the number of first structures 120*a* is different from the number of second structures 120*b*. The difference in individual camber angles and numbers of the structures may result in different axial compliance coefficients of the two sets of structures.

Furthermore, individual camber angles of structures within each set may differ. For example, at least one of first structures 120*a* may have a different individual camber angle than at least another one of first structures 120*a*. In this example, all second structures 120*b* may have identical individual camber angles. Alternatively, at least one of second structures 120*b* may have a different individual camber angle than at least another one of second structures 120*b*. In another example, at least one of second structures 120*b* may have a different individual camber angle than at least another one of second structures 120*b*. In this example, all first structures 120*a* may have identical individual camber angles. Alternatively, at least one of first structures 120*a* may have a different individual camber angle than at least another one of first structures 120*a*.

Referring generally to FIGS. 8A-8B, and 9A-9B, and particularly to, e.g., FIG. 7B, first structures 120*a* have a first combined camber angle. Second structures 120*b* have a second combined camber angle. The first combined camber angle is different from the second combined camber angle. The preceding subject matter of this paragraph characterizes example 35 of the present disclosure, wherein example 35 includes the subject matter of any one of examples 20-29, 31, or 32, above. Different combined camber angles of first set 117 and second set 119 may yield different axial compliance coefficients in these sets.

While the first combined camber angle is different from the second combined camber angle, individual camber angles of all structures in each set may be identical or different. For example, individual camber angles of all first structures 120*a* may be identical. In this example, the individual camber angles of all second structures 120*b* may be identical to each other, but different from the individual camber angles of first structures 120*a*. For example, the individual camber angles of all second structures 120*b* may be less than the individual camber angles of first structures 120*a*. Alternatively, the individual camber angles of all second structures 120*b* may be identical to each other and also identical to the individual camber angles of first structures 120*a*. However, the number of first structures 120*a* may be different from the number of second structures 120*b*. For example, the number of second structures 120*b* may greater than the number of first structures 120*a*. In alternative examples, the individual camber angles of second structures 120*b* may different. Furthermore, the individual camber angles of all second structures 120*b* may identical, but the individual camber angles of first structures 120*a* may different. For example, at least one of first structures 120*a* may have a different individual camber angle that at least another one of first structure 120*a*.

Referring generally to FIGS. 8A-8B, and 9A-9B, and particularly to, e.g., FIG. 7B, the first combined camber angle is less than the second combined camber angle. The preceding subject matter of this paragraph characterizes example 36 of the present disclosure, wherein example 36 includes the subject matter of example 35 above. As noted above, different combined camber angles of first set 117 and second set 119 may yield different axial compliance coefficients in these sets. Since a greater combined camber angle may result in a higher axial compliance coefficient, the first combined camber angle may be greater than the second combined camber angle in order for the first axial compliance coefficient of first set 117 to be greater than the second axial compliance coefficient of second set 119.

In some examples, the first combined camber angle is greater than the second combined camber angle by at least about 5% or even at least about 25% or even 50%. The first combined camber angle may be greater than the second combined camber angle due one or more factors, such as different individual camber angles of first structures 120*a* and second structures 120*b*, different number of first structures 120*a* and second structures 120*b*, or a combination of both. Furthermore, as described above, camber angles of all structures in each set may be the same or different.

Referring generally to FIGS. 8A-8B, shank 110 further comprising cutting edge 121. First structures 120*a* are closer to cutting edge 121 than second structures 120*b*. The preceding subject matter of this paragraph characterizes example 37 of the present disclosure, wherein example 19 includes the subject matter of any one of examples 20-36, above. Cutting edge 121 may be a drill bit, a countersink, a counter-bore, a tap, a die, a milling cutter, a reamer, or a cold saw blade. Additional examples of cutting edge 121 include, but are not limited to an end mill, a roughing end mill, a ball nose cutter, a slab mill, a side-and-face cutter, a involute gear cutter, a hob, a thread mill, a face mill, a fly cutter, a woodruff cutter, a hollow mill, a dovetail cutter, or a shell mill. When such examples of cutting edge 121 are used, an axial load may be applied to the structures as described above.

Referring generally to FIGS. 1, 9A, and 9B, and particularly to, e.g., FIG. 10 (blocks 1004 and 1008) method 1000 of forming shank 110 is provided. Method 1000 comprises arranging first structures 120*a* in first set 117 and second structures 120*b* in second set 119 such that first structures 120*a* and second structures 120*b* extend away from longitudinal central axis 112 in a direction normal to longitudinal central axis 112. Method 1000 also comprises indirectly bonding first set 117 of first structures 120*a* to second set 119 of second structures 120*b*. The preceding subject matter of this paragraph characterizes example 38 of the present disclosure.

Indirect bonding of the structures of first set 117 and second set 119 may be performed after fabricating these structures (e.g., individually), which allows using various materials, shapes, and other features for these structures. When first structures 120*a* in first set 117 and second structures 120*b* in second set 119 are arranged, the engaging ends of these structures may be aligned such that these ends follow a profile of an component that shank 110 is later engaged by. In some examples, the profile may be a cylinder. The structures may be arranged using an alignment tool that has a similar profile. For example, the structures may be slid onto the alignment tool and indirectly bonded while being arranged on the tool, after which the tool may be removed.

In some embodiments, prior to arrangement of first structures 120*a* in first set 117 and second structures 120*b* in second set 119, first structures 120*a* may receive a different heat treatment (e.g., annealing) or chemical treatment (e.g., coating with another material, carbonization, and the like) than second structures 120*b*. In some embodiments, different heat and/or chemical treatment may be applied to structures of the same set. Different treatments may be used to achieve different axial compliance coefficients between different structures.

Various bonding techniques may be used for indirectly bonding first set 117 of first structures 120*a* to second set 119 of second structures 120*b*. Some examples of such techniques include welding (using, e.g., a gas flame, an electric arc, a laser, an electron beam, friction, and ultrasound), adhesive bonding, mechanical coupling, and the like. A specific example of diffusion bonding of the two sets is further described below in more details. When the two sets are indirectly bonded together, each of these sets may be monolithic. Alternatively, at least some structure in one or both of these sets may be indirectly bonded to other structures of the same set. Furthermore, when the parts of the two sets, but not the entire two sets, are monolithic, these parts may present at the interface of the two sets and extend in both directions from this interface along longitudinal central axis 112. Other structures of each set may be bonded to these parts.

In some embodiments, after indirectly bonding first set 117 of first structures 120*a* to second set 119 of second structures 120*b*, first set 117 of first structures 120*a* and second set 119 of second structures 120*b* may be machined or grinded to ensure alignment of engagement surfaces of first structures 120*a* and second structures 120*b*. For example, first structures 120*a* and second structures 120*b* may not be sufficiently aligned after arranging first structures 120*a* in first set 117 and second structures 120*b* in second set 119 and/or become misaligned while indirectly bonding first set 117 of first structures 120a to second set 119 of second structures 120b. Machining and/or grinding of at least the engagement surfaces ensures that these surfaces have substantially the same level of engagement (e.g., compression force).

Referring generally to FIGS. 1, 9A, and 9B, and particularly to, e.g., FIG. 10 (block 1012), method 1000 further comprises indirectly bonding first structures 120a together and indirectly bonding second structures 120b of second set 119 together. The preceding subject matter of this paragraph characterizes example 39 of the present disclosure, wherein example 39 includes the subject matter of example 38 above.

Structures may be indirectly connected together within each set (e.g., first structures 120a are indirectly connected together via first connectors 125a, and, similarly, second structures 120b are indirectly connected together via second connectors 125b) to ensure mechanical and functional integrity of that set of structures. Furthermore, this indirect connection may allow transferring various loads between the structures within the set (e.g., through their connectors that may be directly connected as, for example, described above with reference to FIGS. 9A and 9B). In some examples, the indirect connection between the structures of the set may also impact the axial compliance coefficient of the structures. Without being restricted to any particular theory, it is believed that indirect connection of the structures within a set may reduce the axial compliance coefficient of that set of structures in comparison to a similar set in which the structures are not connected to each other. One example of a shank where the structures are not connected to each other via connectors may include a housing inside which structures are captively retained.

Indirect connection among first structures 120a and/or among second structures 120b may be the result of the structures in one or both sets of structures being monolithic. In some examples, structures within one set may be separate components that are indirectly bonded together (e.g., via their connectors) using one or more bonding techniques. Some examples of such techniques include welding (using, e.g., a gas flame, an electric arc, a laser, an electron beam, friction, and ultrasound), diffusion bonding, adhesive bonding, mechanical coupling, and the like. Having separate structures that are later indirectly bonded into a set allows, in some examples, using structures with different material compositions, shapes, and/or other features that may be more difficult or impossible to achieve with monolithic sets of structures.

Referring generally to FIGS. 1, 9A, and 9B, and particularly to, e.g., FIG. 10 (block 1012), indirectly bonding first structures 120a together comprises indirectly diffusion bonding first structures 120a together. Indirectly bonding second structures 120b of second set 119 together comprises indirectly diffusion bonding second structures 120b of second set 119 together. The preceding subject matter of this paragraph characterizes example 40 of the present disclosure, wherein example 40 includes the subject matter of example 39, above.

Diffusion bonding introduces minimal residual stress, plastic deformation, and may be suitable for materials that cannot be bonded by other techniques (e.g., liquid fusion). As such, diffusion bonding may preserve the geometry and orientations of first structures 120a in first set 117 and second structures 120b in second set 119 when first structures 120a are diffusion bonded together indirectly (e.g., through supported of first structures 120a being diffusion bonded directly) and/or when second structures 120b are diffusion bonded together indirectly (e.g., through supported of first structures 120a being diffusion bonded directly). Furthermore, diffusion bonding allows using different materials for first structures 120a in first set 117 in comparison to materials of second structures 120b in second set 119 when, for example, first structures 120a are monolithic with their connectors and second structures 120b are monolithic with their connectors.

Diffusion bonding is a solid-state welding technique capable of joining similar and dissimilar metals based on solid-state diffusion. Diffusion bonding may involve compressing surfaces of two components at high temperatures resulting in atoms of a first component to diffuse into the second component (e.g., driven by the concentration gradient) and atoms of the second component to diffuse into the first component.

When first structures 120a are diffusion bonded together indirectly and second structures 120b are diffusion bonded together indirectly, supports of first structures 120a may be diffusion bonded together directly and/or supports of second structures 120b may be diffusion bonded together directly. In some examples, first structures 120a may be diffusion bonded to their supports, which may be monolithic or bonded together using one or more bonding techniques, such as diffusion bonding. In some examples, second structures 120b may be diffusion bonded to their supports, which may be monolithic or bonded together using one or more bonding techniques, such as diffusion bonding. In some examples, supports of first structures 120a and supports of second structures 120b are monolithic.

Referring generally to FIGS. 1, 9A, and 9B, and particularly to, e.g., FIG. 10 (block 1008), indirectly bonding first set 117 of first structures 120a to second set 119 of second structures 120b comprises indirectly diffusion bonding first set 117 of first structures 120a to second set 119 of second structures 120b. The preceding subject matter of this paragraph characterizes example 41 of the present disclosure, wherein example 41 includes the subject matter of any one of examples 38-40, above.

Diffusion bonding introduces minimal residual stress, plastic deformation, and may be suitable for materials that cannot be bonded by other techniques (e.g., by liquid fusion). As such, diffusion bonding may preserve the geometry and orientations of first structures 120a in first set 117 and second structures 120b in second set 119 when first structures 120a in first set 117 and second structures 120b in second set 119 are diffusion bonded together indirectly. Furthermore, diffusion bonding allows using different materials for first structures 120a in first set 117 in comparison to materials of second structures 120b in second set 119 when, for example, first structures 120a are monolithic with their connectors and second structures 120b are monolithic with their connectors.

Diffusion bonding is a solid-state welding technique capable of joining similar and dissimilar metals based on solid-state diffusion. Diffusion bonding may involve compressing surfaces of two components at high temperatures resulting in atoms of a first component to diffuse into the second component (e.g., driven by the concentration gradient) and atoms of the second component to diffuse into the first component.

When first set 117 of first structures 120a and second set 119 of second structures 120b are diffusion bonded together indirectly, adjacent end structures of first set 117 of first structures 120a and of second set 119 of second structures 120b may be diffusion bonded together to each other indirectly. More specifically, these structures may be supported by connectors, and these two connectors may be diffusion bonded to each other directly.

FIGS. 9A and 9B schematically illustrates an example of indirect connections of first set 117 of first structures 120a and second set 119 of second structures 120b. One of first structures 120a may be an end structure of first set 117, which is adjacent to second set 119. First structure 120a may be supported by one of first connectors 125a and may extend from first connector 125a toward longitudinal central axis 112 as shown in FIGS. 9A and 9B. First structure 120a and first connector 125a may both have annular shapes. One of second structures 120b may be an end structure of second set 119, which is adjacent to first set 117. Second structure 120b may be supported by one of second connectors 125b and may extend from second connector 125b toward longitudinal central axis 112. Second structure 120b and second connector 125b may both have annular shapes.

One of first structures 120a (an end structure of first set 117 of first structures 120a) may be indirectly connected to one of second structures 120b (an end structure of second set 119 of second structures 120b) via first connector 125a and second connector 125b. For example, first connector 125a and second connector 125b may be directly bonded to each other using one of suitable bonding techniques. First structure 120a and first connector 125a may be monolithic or directly bonded to each other. Second structure 120b and second connector 125b may be monolithic or directly bonded to each other. In some examples, first connector 125a may be monolithic with second connector 125b, while first structure 120a and second structure 120b may be directly bonded to first connector 125a and second connector 125b, respectively, using one or more bonding techniques. It should be noted that while first connector 125a and second connector 125b may directly contact each other, first structure 120a and second structure 120b are spaced apart from each other even though first structure 120a may be indirectly connected to structure 120b.

Referring generally to FIGS. 8A-8B and 9A-9B, and particularly to, e.g., FIGS. 9A-9B, at least one of first structures 120a is made of a first material. At least one of second structures 120b is made of a second material. The first material is identical to the second material. The preceding subject matter of this paragraph characterizes example 42 of the present disclosure, wherein example 42 includes the subject matter of any one of examples 38-41, above.

Materials of first structures 120a and second structures 120b effect mechanical properties of these structures and sets and, in particular, their axial compliance coefficients. For example, when all structures of both sets are made from the identical material, the difference in the axial compliance coefficients between these two sets may be achieved by different geometries of the structures or some other characteristics. Furthermore, when all structures of both sets are made from the identical material, the entire shank may be monolithic or may be bonded more easily than, for example, when materials of the two sets are different. Alternatively, even though at one of first structures 120a is made from the identical material as at least one of second structures 120b, other structures in these sets may be made from other materials, which may be used to tailor axial compliance coefficients of the sets and individual structures within the sets.

For purposes of these disclosure, the materials of different structures are identical when material composition, morphology (e.g., crystallinity), and other material characteristics of these structure are identical (or vary by less than 1%, for example). It should be noted that the structures (made from the identical materials) may still have different size, shape, and other geometric characteristics. In some examples, all first structures 120a are made of the first material. Furthermore, all second structures 120b are made of the second material. In other words, all structures of shank 110 are made from the identical material. Some examples of the first material and second material include titanium (e.g., for weight reduction, allowing for rapid changes in the rotational speed of the shank, preventing corrosion, and/or using with high magnetic fields), beryllium-copper alloys (e.g., small structures, structures with micro-features), stainless steel (e.g., for weldability and/or corrosion resistance), tool steel (e.g., as a body material due to its high strength, hardness, and low cost), tungsten (e.g., for structures with a high compliance coefficient or for body material to minimize bending). The selection of the materials may also ensure coupling (e.g., heat shrinking) between the shank and, for example, receiver.

Referring generally to FIGS. 8A-8B and 9A-9B, and particularly to, e.g., FIGS. 9A-9B, at least another of first structures 120a is made of a third material. At least another of second structures 120b is made of a fourth material. The first material is different from the third material. The second material is different from the fourth material. The preceding subject matter of this paragraph characterizes example 43 of the present disclosure, wherein example 43 includes the subject matter of example 42, above.

Different materials may be used for first structures 120a and for second structures 120b to achieve the difference in the axial compliance coefficients along longitudinal central axis 112 and specific distribution of these axial compliance coefficients along longitudinal central axis 112. Furthermore, different materials may be used to achieve different static friction levels between structures and another component, which may engage shank 110.

For purposes of these disclosure, the materials of different structures are different when at least one of the material composition, morphology (e.g., crystallinity), or any other material characteristic of these structure differ (e.g., by at least 1%). For example, one structure in a set may receive a different heat treatment (e.g., annealing) or chemical treatment (e.g., coating with another material, carbonization, and the like) than another structure in the same set. Alternatively, different structures of the same set may be formed from different materials, such tool steel and tungsten, or titanium and beryllium-copper alloy, or tool steel and stainless steel, and then indirectly bonded together to a set. In some examples, the third material may be the same as the fourth material. Alternatively, the third material may different from the fourth material.

Referring generally to FIGS. 8A-8B and 9A-9B, and particularly to, e.g., FIGS. 9A-9B, at least one of first structures 120a is made of a first material. At least one of second structures 120b is made of a second material. The first material is different from the second material. The preceding subject matter of this paragraph characterizes example 44 of the present disclosure, wherein example 44 includes the subject matter of any one of examples 38-37, above.

Materials of first structures 120a and second structures 120b have an effect on mechanical properties of these structures and sets and in, particular, on their axial compliance coefficients. For example, when the structures of two sets are made from different materials, this difference may be used to achieve different axial compliance coefficients of these sets.

For example, the first material used for of first structures 120*a* may have a lower elastic modulus than the second material used for of second structures 120*b*. In some examples, the elastic modulus of the first material may be at least 5% less than that of the second material or even at least 10% less. This difference in the elastic modulus may result in different axial compliance coefficients of the sets, i.e., the first axial compliance coefficient of first set 117 of first structures 120*a* being greater than the second axial compliance coefficient of second set 119 of second structures 120*b*. For example, the first material may be tool steel, while the second material may be tungsten. In another example, the first material may titanium, while the second material may be a beryllium-copper alloy. In yet another example, the first material may tool steel, while the second material may be stainless steel.

Referring generally to FIGS. 8A-8B and 9A-9B, and particularly to, e.g., FIGS. 9A-9B, at least another of first structures 120*a* is made of a third material. At least another of second structures 120*b* is made of a fourth material. The first material is identical to the third material. The second material is identical to the fourth material. The preceding subject matter of this paragraph characterizes example 45 of the present disclosure, wherein example 45 includes the subject matter of example 44, above.

Forming multiple structure of the same set or even an entire set of the same material may be more efficient from the shank fabrication standpoint. Furthermore, the set may be monolithic. Yet, using different materials for different sets may be help to achive different axial compliance coefficients of different set. For example, the first material (and the third material) use for first structures 120*a* may have a lower elastic modulus than the second material (and the fourth material) used for second structures 120*b*. For example, the first material may be tool steel, while the second material may be tungsten. In another example, the first material may titanium, while the second material may be a beryllium-copper alloy. In yet another example, the first material may tool steel, while the second material may be stainless steel. In some examples, all first structures 120*a* is made from the same materials. Alternatively, at least one of first structures 120*a* is made from a material different from the first material (and the third material). In some examples, all second structures 120*b* is made from the same materials. Alternatively, at least one of second structures 120*b* is made from a material different from the first material (and the third material).

Referring generally to FIGS. 7A, 8A-8B, and 9A-9B, and particularly to, e.g., FIG. 7A, first structures 120*a* have a first combined average width measured along longitudinal central axis 112 of shank 110. Second structures 120*b* have a second combined average width measured along longitudinal central axis 112 of shank 110. The first combined average width is identical to the second combined average width. The preceding subject matter of this paragraph characterizes example 46 of the present disclosure, wherein example 46 includes the subject matter of any one of examples 38-45, above. A width of a structure is one of several factors determining the axial compliance coefficient of this structure. With all other factors being the same, a wider structure may have a smaller axial compliance coefficient than a similar but narrower structure. For a set including one or more structure, a combined average width of all structures in the set may be used as one of many indicators of the axial compliance coefficient of this set. However, this is not the only indicators. As such, even with first structures 120*a* and second structures 120*b* having the same combined average width, the first axial compliance coefficient of first set 117 may be greater than the second axial compliance coefficient of second set 119 of second structures 120*b*.

For purposes of this disclosure, an individual average width of a single structure is defined as a ratio of the cross-sectional area (or half of the cross-sectional area for annular structures) to the length of this structure. The length is defined as its dimension in a direction perpendicular to longitudinal central axis 112. This definition accounts for non-rectangular shapes of structures, such as structures having taper, shaped structure, and the like. Unless specifically, noted a width of structure is referred to as an average width of this structure. The combined average width of a set is defined as a sum of individual average widths of all structures in this set. These individual average widths within the same set may all the same or different (e.g., increase from one end of the set to the other end).

When first structures 120*a* and second structures 120*b* have identical combined average widths, first structures 120*a* and second structures 120*b* may have identical individual widths. Furthermore, identical combined average widths in two different sets may be achieved using structures having different individual widths. In one example, all first structures 120*a* may have identical individual widths. In the same example, all second structures 120*b* may have identical individual widths, which may be the same as the individual widths of first structures 120*a*. In this case, the number of first structures 120*a* and second structures 120*b* may be the same (in order for the combined average widths to be the same for both sets). Furthermore, in this case, the difference between axial compliance coefficients of the two sets may be attributed to different factors. Alternatively, all second structures 120*b* may have identical individual widths, but these individual widths may be different from individual widths of first structures 120*a*. In this case, the number of first structures 120*a* is different from the number of second structures 120*b* (in order for the combined average widths to be the same for both sets). This difference in individual widths and/or number of structures between first set 117 and second set 119 may result in axial compliance coefficients of these two sets being different.

Furthermore, the individual widths of structures within each set may differ. For example, at least one of first structures 120*a* may have a different individual width than at least another one of first structures 120*a*. In this example, all second structures 120*b* may have identical individual widths. Alternatively, at least one of second structures 120*b* may have a different individual width than at least another one of second structures 120*b*. In another example, at least one of second structures 120*b* may have a different individual width than at least another one of second structure 120*b*. In this example, all first structures 120*a* may have the same individual width. Alternatively, at least one of first structures 120*a* may have a different individual width than at least another one of first structures 120*a*.

Referring generally to FIGS. 7A, 8A-8B, and 9A-9B, and particularly to, e.g., FIG. 7A, first structures 120*a* have a first combined average width, measured along longitudinal central axis 112 of shank 110. Second structures 120*b* have a second combined average width, measured along longitudinal central axis 112 of shank 110. The first combined average width is different from the second combined average width. The preceding subject matter of this paragraph characterizes example 47 of the present disclosure, wherein example 47 includes the subject matter of any one of examples 38-45, above. Different combined average widths of first structures 120*a* in first set 117 and second structures 120*b* in second set 119 may yield different axial compliance coefficients in these sets. FIG. 7A illustrates shank 110 that has first structure 120a and second structure 120b. Individual width $W_1$ of first structure 120a is smaller than individual width $W_2$ of second structure 120b. As a result, first structure 120a may have a larger axial compliance coefficient than second structure 120b. Scaling up this example to sets, the first combined average width of first structures 120a is different from the second combined average width of second structures 120b, resulting in the first axial compliance coefficient of first set 117 being different from the second axial compliance coefficient of second set 119.

While the first combined average width is different from the second combined average width, individual widths of all structures in each set may be the same or different. For example, the individual widths of all first structures 120a may be the same. In this example, the individual widths of all second structures 120b may be the same, but different from the individual widths of first structures 120a. For example, the individual widths of all second structures 120b may greater than the individual widths of first structures 120a. Alternatively, the individual widths of all second structures 120b may be the same and also the same as the individual widths of first structures 120a. However, the number of first structures 120a may be different from the number of second structures 120b. For example, the number of second structures 120b may greater than the number of first structures 120a. In alternative examples, the individual widths of second structures 120b may different. Furthermore, the individual widths of all second structures 120b may the same, but the individual widths of first structures 120a may different. For example, at least one of first structures 120a may have a different individual width than at least another one of first structures 120a.

Referring generally to FIGS. 7A, 8A-8B, and 9A-9B, and particularly to, e.g., FIG. 7A, the first combined average width is less than the second combined average width. The preceding subject matter of this paragraph characterizes example 48 of the present disclosure, wherein example 48 includes the subject matter of example 47, above. As noted above, different widths of the structures in first set 117 and second set 119 may yield different axial compliance coefficients in these sets. Since a greater combined average width may result in a lower axial compliance coefficient, the first combined average width may be less than the second combined average width in order for the first axial compliance coefficient of first set 117 to be greater than the second axial compliance coefficient of second set 119.

In some examples, the first combined average width is less than the second combined average width by at least about 5% or even at least about 50% or even 100%. The first combined average width may be less than the second combined average width due one or more factors, such as different average individual widths of first structures 120a and second structures 120b, different number of first structures 120a and second structures 120b, or a combination of both. Furthermore, as described above, individual widths of all structures in each set may be the same or different.

Referring generally to FIGS. 8A-8B, and 9A-9B, and particularly to, e.g., FIG. 7C, first structures 120a have a first combined length measured perpendicular to longitudinal central axis 112 of shank 110. Second structures 120b have a second combined length measured perpendicular to longitudinal central axis 112 of shank 110. The first combined length is identical to the second combined length. The preceding subject matter of this paragraph characterizes example 49 of the present disclosure, wherein example 49 includes the subject matter of any one of examples 38-47, above.

A length of a structure is one of factors determining the axial compliance coefficient of this structure. With all other factors being the same, a longer structure may have a larger axial compliance coefficient than a similar, but shorter structure. For a set including one or more structures, a combined length of all structures in the set is one of several factors affecting the axial compliance coefficient of the set. As noted above, the combined average width of the structures in each set may be another factor affecting the axial compliance coefficient. Accordingly, even with first structures 120a and second structures 120b having identical combined lengths, the first axial compliance coefficient of first set 117 may be greater than the second axial compliance coefficient of second set 119 of second structures 120b. For example, first structures 120a have a smaller combined average width than second structures 120b as, for example, shown in FIG. 7C.

For purposes of this disclosure, an individual length of a structure is defined as its dimension in a direction perpendicular to longitudinal central axis 112 measured from the base of the structure to the tip the structure. FIG. 7A identifies length (L) of one structure. The base of the structure may be its connector. The tip of the structure may be a part of the surface engaging another component, e.g., a receiver, during operation of shank 110. The combined length of a set is defined as a sum of individual lengths of all structures in this set. All structures within the same set have identical individual lengths. Furthermore, first structures 120a and second structures 120b have identical individual lengths. In other words, all structures of shank 110 have identical individual lengths. When the number of first structures 120a is identical to the number of second structures 120b, the first combined length is identical to the second combined length. In this case, the difference between axial compliance coefficients of the two sets may be attributed to other factors (e.g., different combined average widths of first set 117 and second set 119).

Referring generally to FIGS. 8A-8B, and 9A-9B, and particularly to, e.g., FIGS. 7D and 7E, first structures 120a have a first combined length measured perpendicular to longitudinal central axis 112 of shank 110. Second structures 120b have a second combined length measured perpendicular to longitudinal central axis 112 of shank 110. The first combined length is different from the second combined length. The preceding subject matter of this paragraph characterizes example 50 of the present disclosure, wherein example 50 includes the subject matter of any one of examples 38-47, above.

While the first combined length of first structures 120a may be different from the second combined length of second structures 120b, individual lengths of all structures in both sets are identical. Accordingly, the number of first structures 120a may be different from the number of second structures 120b. For example, the number of second structures 120b may be fewer than the number of first structures 120a, as illustrated in FIG. 7E. In this example, individual widths of second structures 120b are greater than individual widths of first structures 120a. It should be noted that in this example the first combined average width may be the same as the second combined average width. For example, individual widths of second structures 120b may be twice greater than individual widths of first structures 120a while there may be twice fewer second structures 120b than first structures 120a. Alternatively, the number of second structures 120b may be greater than the number of first structures 120a, as illustrated in FIG. 7D. Individual widths of second structures 120b may be the same as individual widths of first structures 120a as shown in FIG. 7D or different. It should be noted that in both examples shown in FIGS. 7D and 7E, the first axial compliance coefficient of first set 117 of first structures 120a is greater than the second axial compliance coefficient of second set 119 of the second structures 120b.

Referring generally to FIGS. 8A-8B, and 9A-9B, and particularly to, e.g., FIG. 7E, the first combined length is greater than the second combined length. The preceding subject matter of this paragraph characterizes example 51 of the present disclosure, wherein example 51 includes the subject matter of example 50, above.

As noted above, different combined lengths of first structures 120a and second structures 120b may yield different axial compliance coefficients for their corresponding sets. Specifically, if the first combined length of first structures 120a is greater than the second combined length of second structures 120b, the first axial compliance coefficient of first set 117 may be greater than the second axial compliance coefficient of second set 119 as, for example, shown in FIG. 7E.

In some examples, the first combined length is greater than the second combined length by at least about 5%. In other examples, the first combined length is greater than the second combined length by at least about 50%. In still other examples, the first combined length is greater than the second combined length by at least about 100%. When the first combined length is greater than the second combined length, this is due to a larger number of first structures 120a than of second structures 120b.

Referring generally to FIGS. 7A, 8A-8B, and 9A-9B, and particularly to, e.g., FIG. 7B, first structures 120a have a first combined camber angle. Second structures 120b have a second combined camber angle. The first combined camber angle is identical to the second combined camber angle. The preceding subject matter of this paragraph characterizes example 52 of the present disclosure, wherein example 52 includes the subject matter of any one of examples 38-47, 49, or 50, above.

A camber angle of a structure is one of factors determining the axial compliance coefficient of this structure. With all other factors being the same, a structure with a smaller camber angle may have a larger axial compliance coefficient than a similar structure with a larger camber angle. For a set including one or more structures, a combined camber angle of all structures in the set may be used as one of many indicators of the axial compliance coefficient of that set. As noted above, the widths and lengths of structures in each set may other indicators of the axial compliance coefficient of that set. As such, even with first structures 120a and second structures 120b having identical combined camber angles, the first axial compliance coefficient of first set 117 may be greater than the second axial compliance coefficient of second set 119 of second structures 120b.

For purposes of this disclosure, an individual camber angle of a structure (one of first structures 120a or second structures 120b) is defined as an angle between one side of a cross-section of that structure and an axis extending perpendicular to longitudinal central axis 112 in the plane of the cross-section. When both sides of the cross-section of the structure are symmetrical with respect to that axis, either one of the sides may be used for determining the individual camber angle of this structure. However, when the two sides are not symmetrical, an average value of camber angles of both sides is used as an individual camber angle for the corresponding structure. The individual camber angle may be positive or negative, depending on the position of the side relative to the axis extending perpendicular to longitudinal central axis 112. Another way of determining whether the individual camber angle is positive or negative is based on the angle between the side and longitudinal central axis 112. Specifically, if the side and longitudinal central axis 112 form an obtuse angle, then the individual camber angle is positive. However, if the side and longitudinal central axis 112 form an acute angle, then the individual camber angle is negative. Finally, if the side and longitudinal central axis 112 are perpendicular, then the individual camber angle is zero. A combined camber angle of a set is defined as a sum of all individual camber angles for all structures in that set.

When first structures 120a and second structures 120b have identical combined camber angles, first structures 120a and second structures 120b may have identical individual camber angles. Furthermore, identical combined camber angles may be achieved in both sets with structures having different individual camber angles. In one example, all first structures 120a may have identical individual camber angles. In the same example, all second structures 120b may have identical individual camber angles, which may be also identical to individual camber angles of first structures 120a. In this case, the number of first structures 120a and second structures 120b may be identical. Furthermore, in this case, the difference between axial compliance coefficients of the two sets may be attributed to different factors (e.g., different combined average widths of first set 117 and second set 119). Alternatively, all second structures 120b may have identical individual camber angles, but this camber angle may be different from the individual camber angle of first structures 120a (all first structures 120a may have identical individual camber angles). In this case, the number of first structures 120a is different from the number of second structures 120b. The difference in individual camber angles and numbers of the structures may result in different axial compliance coefficients of the two sets of structures.

Furthermore, individual camber angles of structures within each set may differ. For example, at least one of first structures 120a may have a different individual camber angle than at least another one of first structures 120a. In this example, all second structures 120b may have identical individual camber angles. Alternatively, at least one of second structures 120b may have a different individual camber angle than at least another one of second structures 120b. In another example, at least one of second structures 120b may have a different individual camber angle than at least another one of second structures 120b. In this example, all first structures 120a may have identical individual camber angles. Alternatively, at least one of first structures 120a may have a different individual camber angle than at least another one of first structure 120a.

Referring generally to FIGS. 7A, 8A-8B, and 9A-9B, and particularly to, e.g., FIG. 7B, first structures 120a have a first combined camber angle. Second structures 120b have a second combined camber angle. The first combined camber angle is different from the second combined camber angle. The preceding subject matter of this paragraph characterizes example 53 of the present disclosure, wherein example 53 includes the subject matter of any one of examples 38-47, 49, or 50, above.

Different combined camber angles of first set 117 and second set 119 may yield different axial compliance coefficients in these sets.

While the first combined camber angle is different from the second combined camber angle, individual camber angles of all structures in each set may be identical or different. For example, individual camber angles of all first structures 120*a* may be identical. In this example, the individual camber angles of all second structures 120*b* may be identical to each other, but different from the individual camber angles of first structures 120*a*. For example, the individual camber angles of all second structures 120*b* may be less than the individual camber angles of first structures 120*a*. Alternatively, the individual camber angles of all second structures 120*b* may be identical to each other and also identical to the individual camber angles of first structures 120*a*. However, the number of first structures 120*a* may be different from the number of second structures 120*b*. For example, the number of second structures 120*b* may greater than the number of first structures 120*a*. In alternative examples, the individual camber angles of second structures 120*b* may different. Furthermore, the individual camber angles of all second structures 120*b* may identical, but the individual camber angles of first structures 120*a* may different. For example, at least one of first structures 120*a* may have a different individual camber angle that at least another one of first structure 120*a*.

Referring generally to FIGS. 7A, 8A-8B, and 9A-9B, and particularly to, e.g., FIG. 7B, the first combined camber angle is less than the second combined camber angle. The preceding subject matter of this paragraph characterizes example 54 of the present disclosure, wherein example 54 includes the subject matter of example 53, above.

As noted above, different combined camber angles of first set 117 and second set 119 may yield different axial compliance coefficients in these sets. Since a greater combined camber angle may result in a higher axial compliance coefficient, the first combined camber angle may be greater than the second combined camber angle in order for the first axial compliance coefficient of first set 117 to be greater than the second axial compliance coefficient of second set 119.

In some examples, the first combined camber angle is greater than the second combined camber angle by at least about 5% or even at least about 25% or even 50%. The first combined camber angle may be greater than the second combined camber angle due one or more factors, such as different individual camber angles of first structures 120*a* and second structures 120*b*, different number of first structures 120*a* and second structures 120*b*, or a combination of both. Furthermore, as described above, camber angles of all structures in each set may be the same or different.

Referring generally to FIGS. 1, 9A, and 9B, and particularly to, e.g., FIG. 10, method 1000 further comprise arranging first set 117 of first structures 120*a* such that first set 117 of first structures 120*a* has a first axial compliance coefficient along longitudinal central axis 112 of interior space 136. Method 1000 also comprises arranging second set 119 of second structures 120*b* such that second set 119 of second structures 120*b* has a second axial compliance coefficient along longitudinal central axis 112 of interior space 136. The preceding subject matter of this paragraph characterizes example 55 of the present disclosure, wherein example 55 includes the subject matter of any one of examples 38-54, above.

Referring generally to FIGS. 8A-8B, shank 110 further comprising cutting edge 121. First structures 120*a* are closer to cutting edge 121 than second structures 120*b*. The preceding subject matter of this paragraph characterizes example 56 of the present disclosure, wherein example 56 includes the subject matter of any one of examples 40-57, above. Cutting edge 121 may be a drill bit, a countersink, a counter-bore, a tap, a die, a milling cutter, a reamer, or a cold saw blade. Additional examples of cutting edge 121 include, but are not limited to an end mill, a roughing end mill, a ball nose cutter, a slab mill, a side-and-face cutter, a involute gear cutter, a hob, a thread mill, a face mill, a fly cutter, a woodruff cutter, a hollow mill, a dovetail cutter, or a shell mill. When such examples of cutting edge 121 are used, an axial load may be applied to the structures as described above.

Examples of the present disclosure may be described in the context of aircraft manufacturing and service method 1100 as shown in FIG. 11 and aircraft 1102 as shown in FIG. 12. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method of forming a shank, the method comprising:
    arranging first structures in a first set of the first structures and second structures in a second set of the second structures
        such that the first structures and the second structures extend away from a longitudinal central axis in a direction normal to the longitudinal central axis; and
        such that ends of the first structures and the second structures, farthest away from the longitudinal central axis, form cylindrical surfaces, parallel to the longitudinal central axis and equidistant from the longitudinal central axis; and
    indirectly bonding the first set of the first structures to the second set of the second structures thereby forming the shank, wherein:
        at least one of the first structures consists of a first material;
        at least one of the second structures consists of a second material;
        the first material is different from the second material;
        any two adjacent ones of the first structures are separated by an empty gap; and
        any two adjacent ones of the second structures are separated by another empty gap.

2. The method of claim 1, further comprising indirectly bonding the first structures together and indirectly bonding the second structures together.

3. The method of claim 2, wherein:
    indirectly bonding the first structures together comprises indirectly diffusion bonding the first structures together, and
    indirectly bonding the second structures together comprises indirectly diffusion bonding the second structures together.

4. The method of claim 1, wherein indirectly bonding the first set of the first structures to the second set of the second structures comprises indirectly diffusion bonding the first set of the first structures to the second set of the second structures.

5. The method of claim 1, wherein:
    at least another of the first structures is made of a third material;
    at least another of the second structures is made of a fourth material;
    the first material is identical to the third material; and
    the second material is identical to the fourth material.

6. The method of claim 1, wherein:
    the first structures have a first combined average width measured along the longitudinal central axis of the shank;
    the second structures have a second combined average width measured along the longitudinal central axis of the shank; and
    the first combined average width is identical to the second combined average width.

7. The method of claim 6, wherein individual widths of the first structures are different from individual widths of the second structures.

8. The method of claim 1, wherein:
    the first structures have a first combined average width measured along the longitudinal central axis of the shank;
    the second structures have a second combined average width measured along the longitudinal central axis of the shank; and
    the first combined average width is different from the second combined average width.

9. The method of claim 8, wherein the first combined average width is less than the second combined average width.

10. The method of claim 1, wherein:
    the first structures have a first combined length measured perpendicular to the longitudinal central axis of the shank;
    the second structures have a second combined length measured perpendicular to the longitudinal central axis of the shank; and
    the first combined length is identical to the second combined length.

11. The method of claim 1, wherein:
    the first structures have a first combined length measured perpendicular to the longitudinal central axis of the shank;
    the second structures have a second combined length measured perpendicular to the longitudinal central axis of the shank; and
    the first combined length is different from the second combined length.

12. The method of claim 11, wherein the first combined length is greater than the second combined length.

13. The method of claim 1, wherein:
    the first structures have a first combined camber angle;
    the second structures have a second combined camber angle; and
    the first combined camber angle is identical to the second combined camber angle.

14. The method of claim 1, wherein:
    the first structures have a first combined camber angle;
    the second structures have a second combined camber angle; and
    the first combined camber angle is different from the second combined camber angle.

15. The method of claim 14, wherein the first combined camber angle is less than the second combined camber angle.

16. The method of claim 1, further comprising:
    arranging the first set of the first structures such that the first set of the first structures has a first axial compliance coefficient along the longitudinal central axis; and arranging the second set of the second structures such that the second set of the second structures has a second axial compliance coefficient along the longitudinal central axis;

wherein the first axial compliance coefficient of the first set of the first structures is greater than the second axial compliance coefficient of the second set of the second structures.

17. The method of claim 1, wherein:

the shank comprises a cutting edge; and the first structures are closer to the cutting edge than the second structures.

18. The method of claim 1, wherein:

each of the first structures is supported by and monolithic with one of first connectors, and each of the second structures is supported by and monolithic with one of second connectors; and indirectly bonding the first set of the first structures to the second set of the second structures comprises directly bonding the first connectors and the second connectors.

19. The method of claim 18, wherein the first structures and the second structures are spaced apart from each other after indirectly bonding the first set of the first structures to the second set of the second structures.

20. The method of claim 19, wherein:

side walls of the any two adjacent ones of the first structures form, at least in part, the empty gap, and side walls of the any two adjacent ones of the second structures form, at least in part, the empty gap.

* * * * *